(12) United States Patent
Son et al.

(10) Patent No.: US 11,307,461 B2
(45) Date of Patent: Apr. 19, 2022

(54) DISPLAY DEVICE

(71) Applicant: Samsung Display Co., LTD., Yongin-si (KR)

(72) Inventors: Jongho Son, Seoul (KR); Young Gu Kim, Yongin-si (KR); Jiyun Park, Hwaseong-si (KR); Jongmin Ok, Hwaseong-si (KR); Sun-Young Chang, Seoul (KR); Hyelim Jang, Hwaseong-si (KR); Baekkyun Jeon, Yongin-si (KR); Kyungseon Tak, Hwaseong-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 16/822,851

(22) Filed: Mar. 18, 2020

(65) Prior Publication Data

US 2020/0379300 A1  Dec. 3, 2020

(30) Foreign Application Priority Data

May 31, 2019 (KR) ......................... 10-2019-0064615

(51) Int. Cl.
*G02F 1/1337* (2006.01)
*G02F 1/13363* (2006.01)

(52) U.S. Cl.
CPC .. *G02F 1/133707* (2013.01); *G02F 1/133634* (2013.01); *G02F 2202/28* (2013.01)

(58) Field of Classification Search
CPC ......... G02F 1/133504; G02F 1/133512; G02F 1/133528; G02F 1/133707; G02F 1/133634; G02F 2202/28

USPC ........................................... 349/96–104, 112
See application file for complete search history.

(56) References Cited

U.S. PATENT DOCUMENTS

| | | | |
|---|---|---|---|
| 9,507,059 B2 | 11/2016 | Shim et al. | |
| 9,507,060 B2 | 11/2016 | Shim et al. | |
| 9,678,379 B2 | 6/2017 | Hong et al. | |
| 10,007,139 B2 | 6/2018 | Oh et al. | |
| 10,268,063 B2 | 4/2019 | Ju et al. | |
| 2016/0178810 A1* | 6/2016 | Chung .................. | G02B 3/005 349/57 |

(Continued)

FOREIGN PATENT DOCUMENTS

| | | |
|---|---|---|
| JP | 6159385 | 7/2017 |
| KR | 10-1640718 | 7/2016 |
| KR | 10-1678649 | 11/2016 |

(Continued)

*Primary Examiner* — Charles S Chang
(74) *Attorney, Agent, or Firm* — Kile Park Reed & Houtteman PLLC

(57) ABSTRACT

Provided is a display device. The display device includes a liquid crystal display panel and an optical film disposed above the liquid crystal display panel, the optical film comprising a first pattern layer having a first refractive index and a second pattern layer having a second refractive index different from the first refractive index and disposed on the first pattern layer. The first pattern layer includes a first base part and a plurality of first protrusions. Each of the first protrusions includes a bottom surface adjacent to the first base part, an upper surface facing the bottom surface, and side surfaces between the bottom surface and the upper surface. Each of the side surfaces is perpendicular to the bottom surface and the upper surface.

21 Claims, 18 Drawing Sheets

(56) References Cited

U.S. PATENT DOCUMENTS

2020/0117042 A1* 4/2020 Park .................... G02F 1/13725

FOREIGN PATENT DOCUMENTS

| KR | 10-1802628 | | 11/2017 | |
|----|------------|---|---------|---|
| KR | 10-1871552 | | 6/2018 | |
| KR | 10-2020-0042059 | * | 4/2020 | ....... G02F 1/133504 |

* cited by examiner

DISPLAY DEVICE

CROSS-REFERENCE TO RELATED APPLICATIONS

This application claims priority to and benefits of Korean Patent Application No. 10-2019-0064615 under 35 U.S.C. § 119, filed in the Korean Intellectual Property Office on May 31, 2019, the entire contents of which are incorporated herein by reference.

BACKGROUND

1. Technical Field

The disclosure herein relates to a display device, and to a liquid crystal display device including an optical film.

2. Description of the Related Art

Various types of display devices are being used to display images and information. Liquid crystal display devices are popular with respect to both large-sized display devices and portable display devices because of an advantage of low power consumption.

A liquid crystal display device provides light emitted from a backlight unit, for example, to a liquid crystal display panel to generate an image. In the liquid crystal display device, optical films having various functions may be added to the outside of a liquid crystal display panel to prevent display quality deterioration due to a viewing angle from being deteriorated.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

The disclosure provides a display device having improved display quality.

The disclosure provides a display device in which a pattern layer on an optical film may be optimized in shape to improve display quality at front and side viewing angles.

An embodiment provides a display device that includes: a liquid crystal display panel; and an optical film disposed above the liquid crystal display panel, the optical film including a first pattern layer having a first refractive index and a second pattern layer having a second refractive index different from the first refractive index and disposed on the first pattern layer. The first pattern layer includes: a first base part; and a plurality of first protrusions disposed on the first base part, wherein each of the first protrusions includes: a bottom surface adjacent to the first base part; an upper surface facing the bottom surface; and side surfaces between the bottom surface and the upper surface, wherein each of the side surfaces is perpendicular to the bottom surface and the upper surface.

In an embodiment, an absolute value of a difference between the first refractive index and the second refractive index may be in a range of about 0.2 to about 0.25.

In an embodiment, in a cross-section perpendicular to the first base part, each of the first protrusions may have a rectangular shape.

In an embodiment, the first refractive index may be less than the second refractive index, and, in a cross-section perpendicular to the first base part, a relationship between a spaced distance ($W_{P1}$) between adjacent first protrusions and a width ($W_1$) of each of the first protrusions may be expressed as $$0.15 \leq W_1/W_{P1} \leq 0.45$$

where, $W_{P1}$ may be a sum of the width ($W_1$) of each of the first protrusions and a minimally spaced distance ($W_2$) between the adjacent first protrusions, and all $W_1$ and $W_2$ may be distances in a direction perpendicular to an extension direction of the first protrusions.

In an embodiment, the first refractive index may be less than the second refractive index, and, in a cross-section perpendicular to the first base part, a relationship between a spaced distance ($W_{P1}$) between adjacent first protrusions and a height ($H_1$) of each of the first protrusions may be expressed as $$0.75 \leq H_1/W_{P1} \leq 1.35$$

where, $W_{P1}$ may be a sum of the width ($W_1$) of each of the first protrusions and a minimally spaced distance ($W_2$) between the adjacent first protrusions, and all $W_1$ and $W_2$ may be distances in a direction perpendicular to an extension direction of the first protrusions.

In an embodiment, the second pattern layer may include: a second base part facing the first base part; and a plurality of second protrusions disposed below the second base part.

In an embodiment, each of the first protrusions and the second protrusions may have a stripe shape that extends in one direction.

In an embodiment, the first pattern layer may include first concave parts defined between the first protrusions, and the second pattern layer may include second concave parts defined between the second protrusions, wherein the first protrusions may be disposed to respectively correspond to the second concave parts, and the second protrusions may be disposed to respectively correspond to the first concave parts.

In an embodiment, the first refractive index may be greater than the second refractive index, and, in a cross-section perpendicular to the second base part, a relationship between a spaced distance ($W_{P2}$) between adjacent second protrusions and a width ($W_2$) of each of the second protrusions may be expressed as $$0.15 \leq W_2/W_{P2} \leq 0.45$$

where, $W_{P2}$ may be a sum of the width ($W_2$) of each of the second protrusions and a minimally spaced distance ($W_1$) between the adjacent second protrusions, and all $W_1$ and $W_2$ may be distances in a direction perpendicular to an extension direction of the second protrusions.

In an embodiment, the first refractive index may be greater than the second refractive index, and In a cross-section perpendicular to the second base part, a relationship between a spaced distance ($W_{P2}$) between adjacent second protrusions and a height ($H_2$) of each of the second protrusions may be expressed as $$0.75 \leq H_2/W_{P2} \leq 1.35$$

where, $W_{P2}$ may be a sum of the width ($W_2$) of each of the second protrusions and a minimally spaced distance ($W_1$) between the adjacent second protrusions, and all $W_1$ and $W_2$ may be distances in a direction perpendicular to an extension direction of the second protrusions.

In an embodiment, the display device may further include a plurality of cavities defined in one surface of the second pattern layer, wherein the first protrusions may be disposed to respectively correspond to the cavities.

In an embodiment, the first pattern layer may be an optically clear adhesive layer.

In an embodiment, the optical film may be directly disposed on the liquid crystal display panel.

In an embodiment, a display device includes: a liquid crystal display panel; and an optical film disposed above the liquid crystal display panel, wherein the optical film includes: a first pattern layer including a first base part and a plurality of first protrusions disposed on the first base part; and a second pattern layer including a second base part and a plurality of second protrusions disposed on the second base part. The first pattern layer has a refractive index less than that of the second pattern layer, and, in a cross-section perpendicular to the first base part, a ratio of a width of each of the first protrusions to a spaced distance between the adjacent first protrusions is in a range of about 0.15 to about 0.45, and, in the cross-section perpendicular to the first base part, a ratio of a height of each of the first protrusions to the spaced distance between the adjacent first protrusions is in a range of about 0.75 to about 1.35.

In an embodiment, the first pattern layer may be disposed closer to the liquid crystal display panel than the second pattern layer, and wherein each of the first protrusions may include: a first bottom surface adjacent to the first base part; a first upper surface adjacent to the second base part; and first side surfaces between the first bottom surface and the first upper surface, wherein, in the cross-section perpendicular to the first base part, an inclined angle of each of the first side surfaces with respect to the first bottom surface is in a range of about 86° to about 90°.

In an embodiment, in the cross-section perpendicular to the first base part, a width of the first bottom surface and a width of the first upper surface may be different from each other.

In an embodiment, the width of each of the first protrusions may be the width of the first bottom surface, and the spaced distance between the first protrusions may be a sum of the width of the first bottom surface and a minimally spaced distance between the first bottom surfaces of the adjacent first protrusions, or the width of each of the first protrusions may be the width of the first upper surface, and the spaced distance between the first protrusions may be a sum of the width of the first upper surface and a minimally spaced distance between the first upper surfaces of adjacent first protrusions.

In an embodiment, the second pattern layer may be disposed closer to the liquid crystal display panel than the first pattern layer, and wherein each of the second protrusions may include: a second bottom surface adjacent to the second base part; a second upper surface adjacent to the first base part; and second side surfaces between the second bottom surface and the second upper surface, wherein, in the cross-section perpendicular to the second base part, an inclined angle of each of the second side surfaces with respect to the second bottom surface may be in a range of about 87° to about 90°.

In an embodiment, in the cross-section perpendicular to the second base part, a width of the second bottom surface and a width of the second upper surface may be different from each other.

In an embodiment, a difference in refractive index between the first pattern layer and the second pattern layer may be in a range of about 0.2 to about 0.25.

BRIEF DESCRIPTION OF THE DRAWINGS

The accompanying drawings are included to provide a further understanding, and are incorporated in and constitute a part of this specification. The drawings illustrate embodiments and, together with the description, serve to explain principles of the disclosure, wherein.

DETAILED DESCRIPTION OF THE EMBODIMENTS

Figure 1:
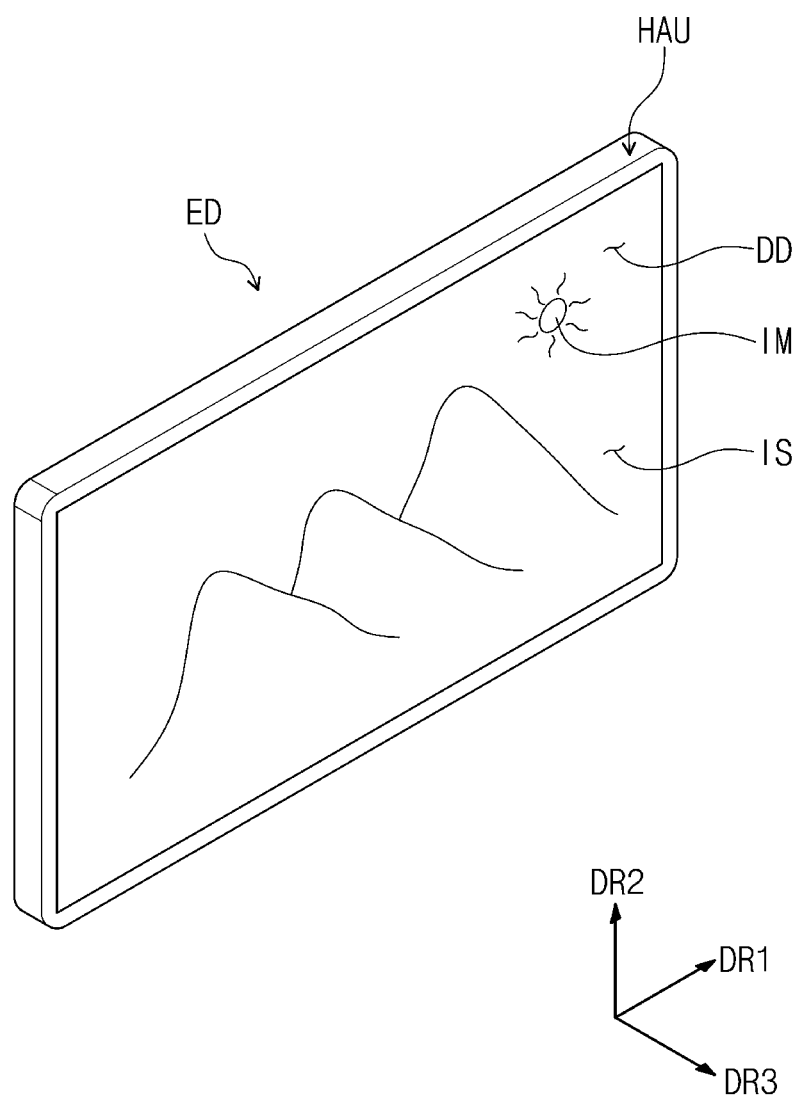
FIG. 1 is a perspective view of an electronic device according to an embodiment

Since the disclosure may have diverse modified embodiments, embodiments are illustrated in the drawings and are described in the detailed description. However, this does not limit the disclosure within specific embodiments and it should be understood that the disclosure covers all the modifications, equivalents, and replacements within the spirit and technical scope of the disclosure.

When a layer, film, region, substrate, or area, is referred to as being "on" another layer, film, region, substrate, or area, it may be directly on the other film, region, substrate, or area, or intervening films, regions, substrates, or areas, may be present therebetween. Conversely, when a layer, film, region, substrate, or area, is referred to as being "directly on" another layer, film, region, substrate, or area, intervening layers, films, regions, substrates, or areas, may be absent therebetween. Further when a layer, film, region, substrate, or area, is referred to as being "below" another layer, film, region, substrate, or area, it may be directly below the other layer, film, region, substrate, or area, or intervening layers, films, regions, substrates, or areas, may be present therebetween. Conversely, when a layer, film, region, substrate, or area, is referred to as being "directly below" another layer, film, region, substrate, or area, intervening layers, films, regions, substrates, or areas, may be absent therebetween. Further, "over" or "on" may include positioning on or below an object and does not necessarily imply a direction based upon gravity.

In this specification, "directly disposed" may mean that there is no layer, film, region, plate, or the like between a portion of the layer, the region, the plate, or the like and the other portion. For example, "directly disposed" may mean being disposed without using an additional member such as an adhesion member between two layers or two members.

Like reference numerals refer to like elements throughout. In the figures, the thickness, ratio, and dimensions of components may be exaggerated for clarity of illustration.

The term "and/or" includes any and all combinations of one or more of the associated listed items.

It will be understood that although the terms such as 'first' and 'second' are used herein to describe various elements, these elements should not be limited by these terms. The terms are only used to distinguish one component from other components. For example, a first element referred to as a first element in one embodiment may be referred to as a second element in another embodiment without departing from the scope of the appended claims. The terms of a singular form may include plural forms unless referred to the contrary.

The spatially relative terms "below", "beneath", "lower", "above", "upper", or the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device illustrated in the drawing is turned over, the device positioned "below" or "beneath" another device may be placed "above" another device. Accordingly, the illustrative term "below" may include both the lower and upper positions. The device may also be oriented in other directions and thus the spatially relative terms may be interpreted differently depending on the orientations. "Disposed on" may refer to a case in which it is disposed on a lower portion as well as an upper portion of any one member.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 5% of the stated value.

Unless otherwise defined, all terms (including technical and scientific terms) used herein have the same meaning as commonly understood by a person of ordinary skill in the art to which this disclosure pertains. Terms such as defined terms in commonly used dictionaries are to be interpreted as having meanings consistent with meaning in the context of the relevant art unless expressly defined herein and should not be interpreted in an ideal or overly formal sense.

The meaning of "include" or "comprise" may specify a property, a fixed number, a step, an operation, an element, a component or a combination thereof, but does not exclude other properties, fixed numbers, steps, operations, elements, components or combinations thereof.

Hereinafter, an electronic device according to an embodiment will be described with reference to the accompanying drawings.

Figure 2:
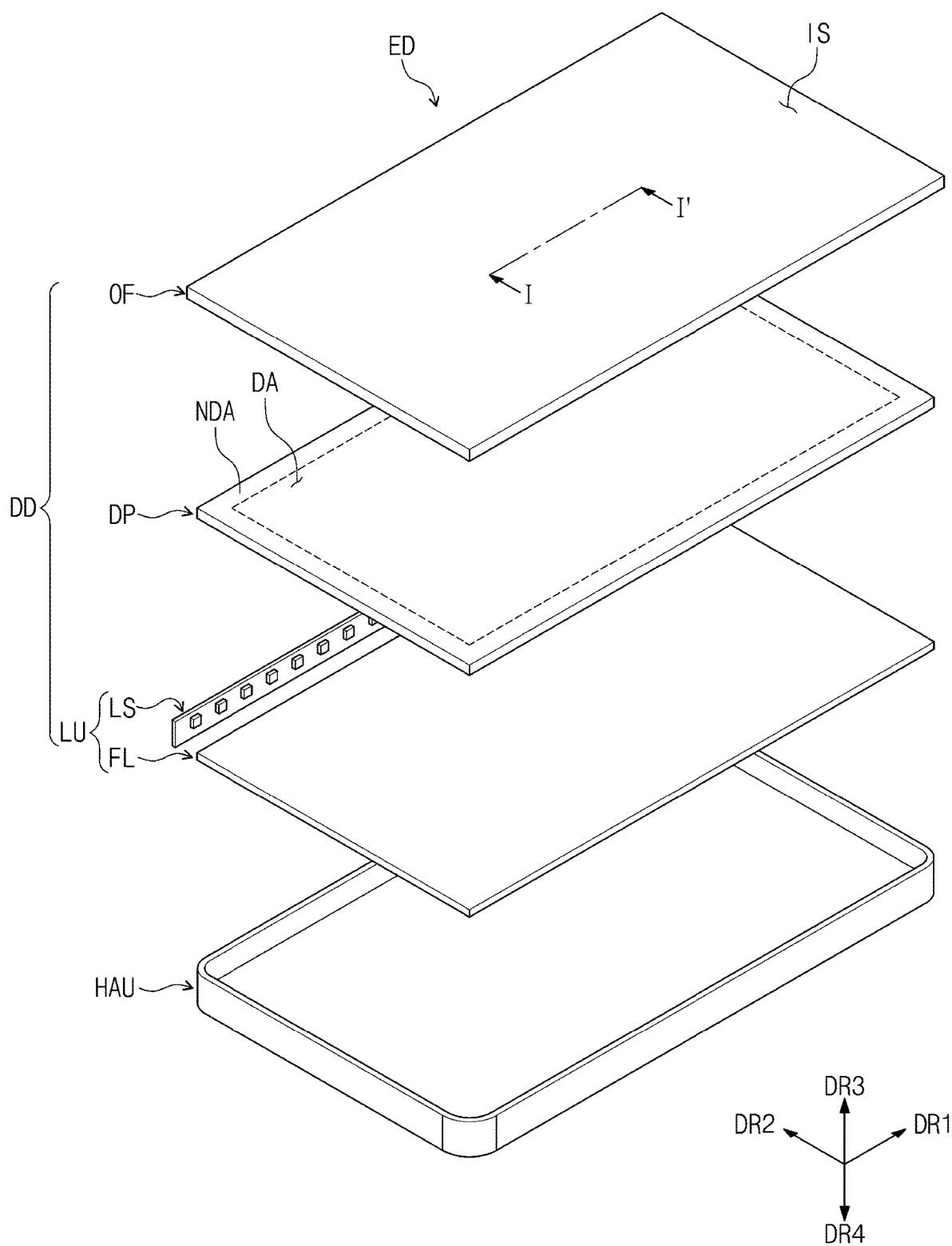
FIG. 2 is an exploded perspective view of the electronic device of FIG. 1.

FIG. 1 is a perspective view of an electronic device. FIG. 2 is an exploded perspective view of the electronic device of FIG. 1.

Figure 3:
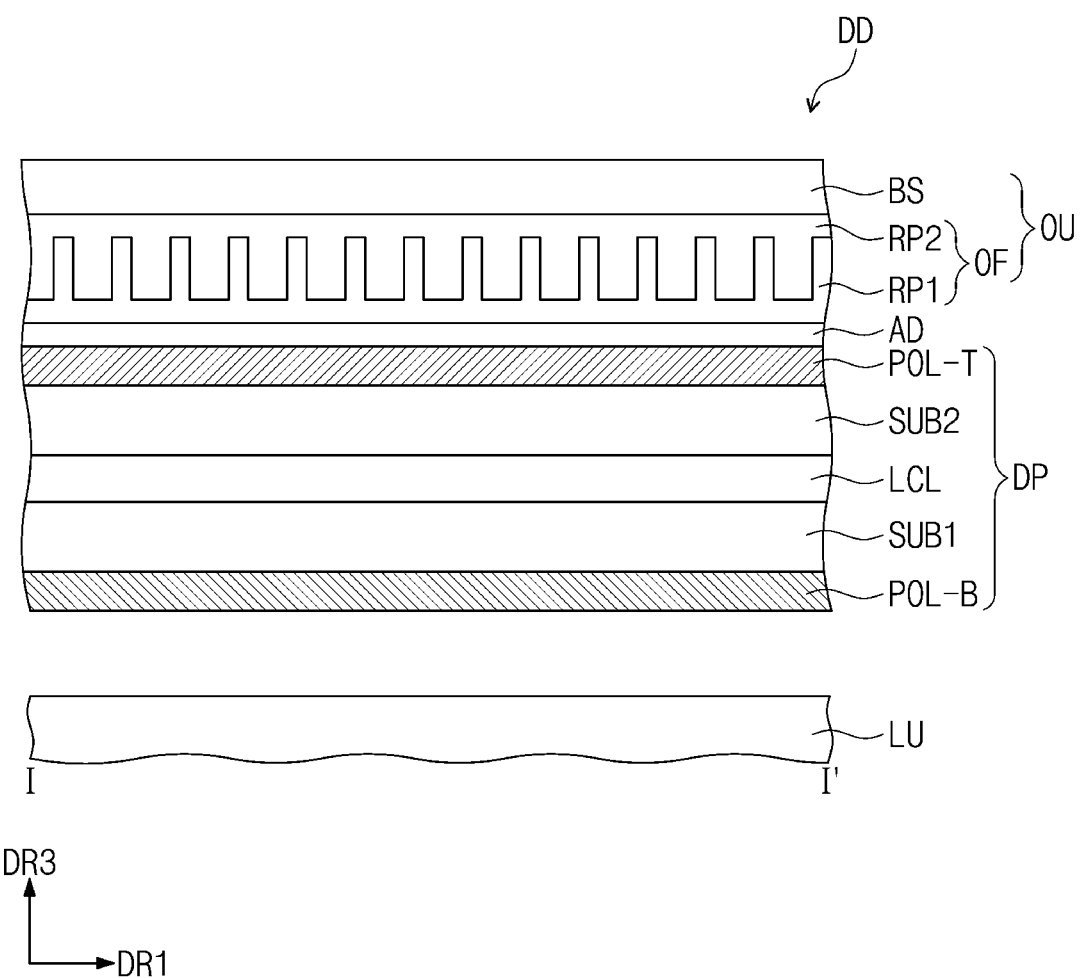
FIG. 3 is a schematic cross-sectional view of a display device taken long line I-I' of FIG. 2 according to an embodiment.
Figure 4:
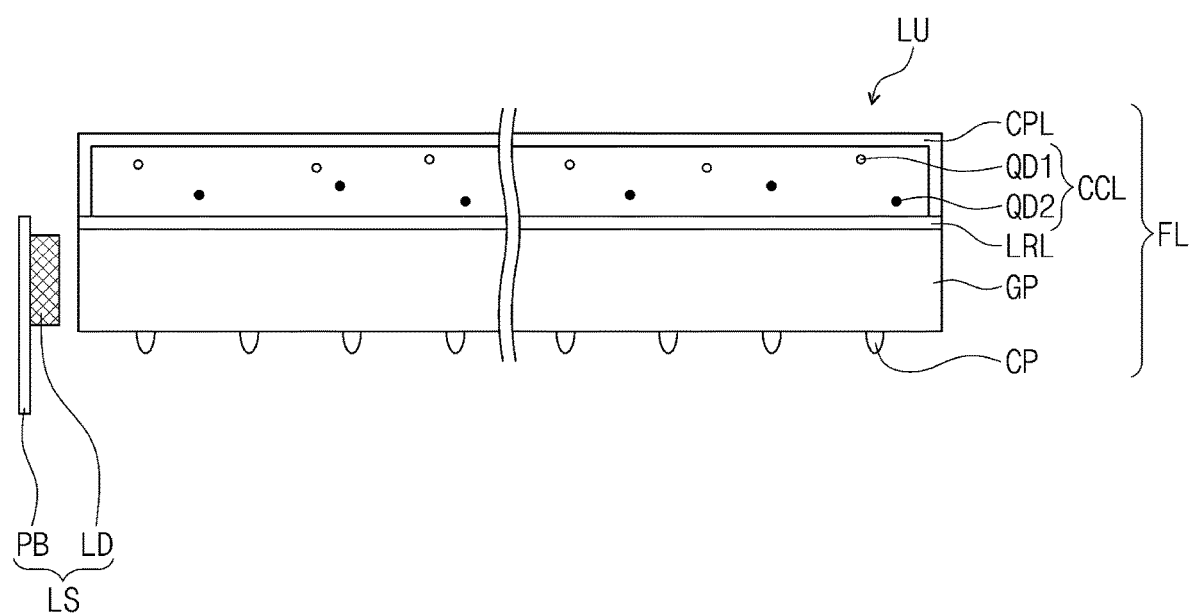
FIG. 4 is a schematic cross-sectional view of a light source member according to an embodiment

FIG. 3 is a schematic cross-sectional view of a display device taken along line I-I' of FIG. 2 according to an embodiment. FIG. 4 is a schematic cross-sectional view of a light source member according to an embodiment.

Figure 5:
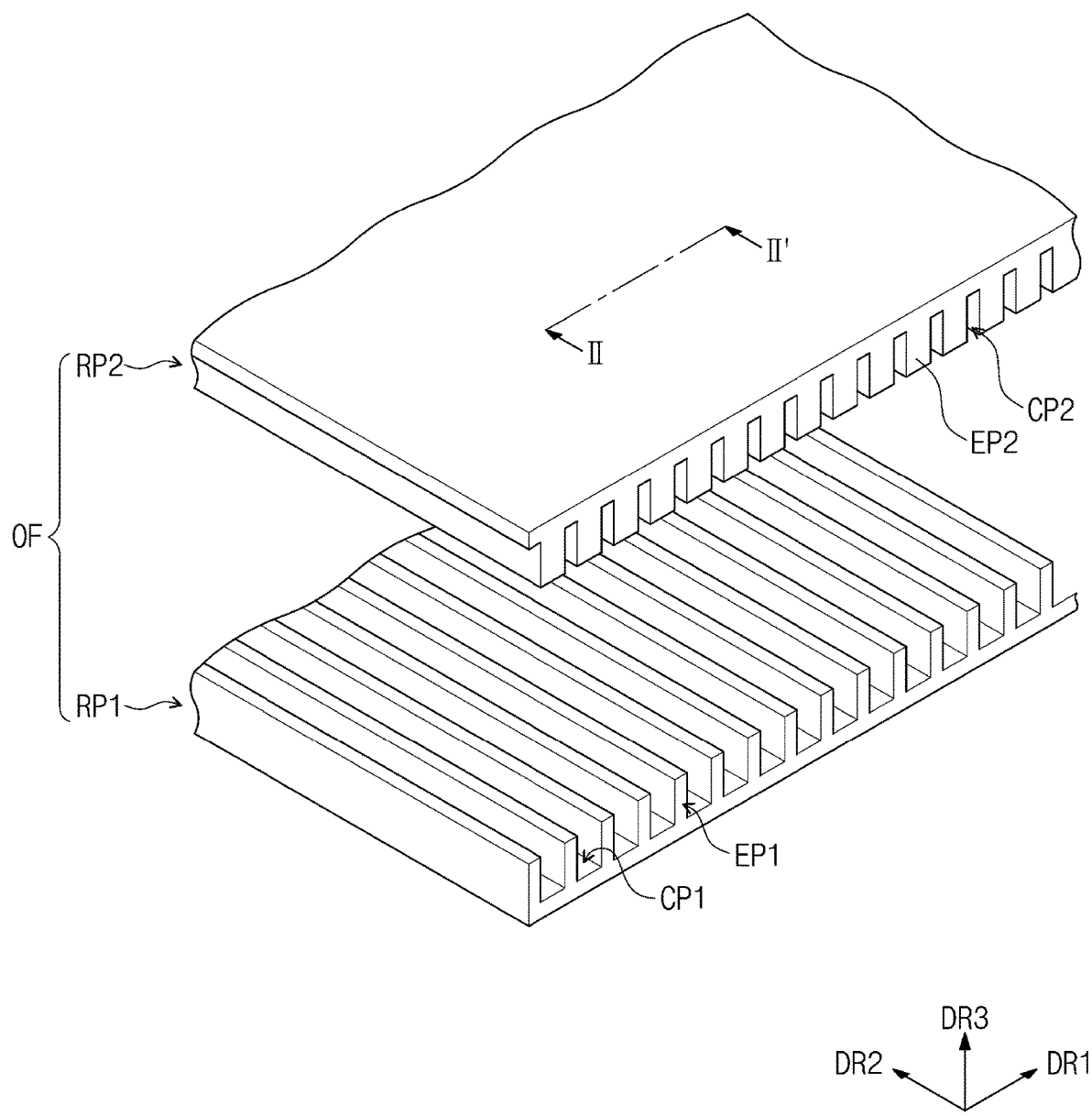
FIG. 5 is an exploded perspective view of an optical film according to an embodiment
Figure 6:
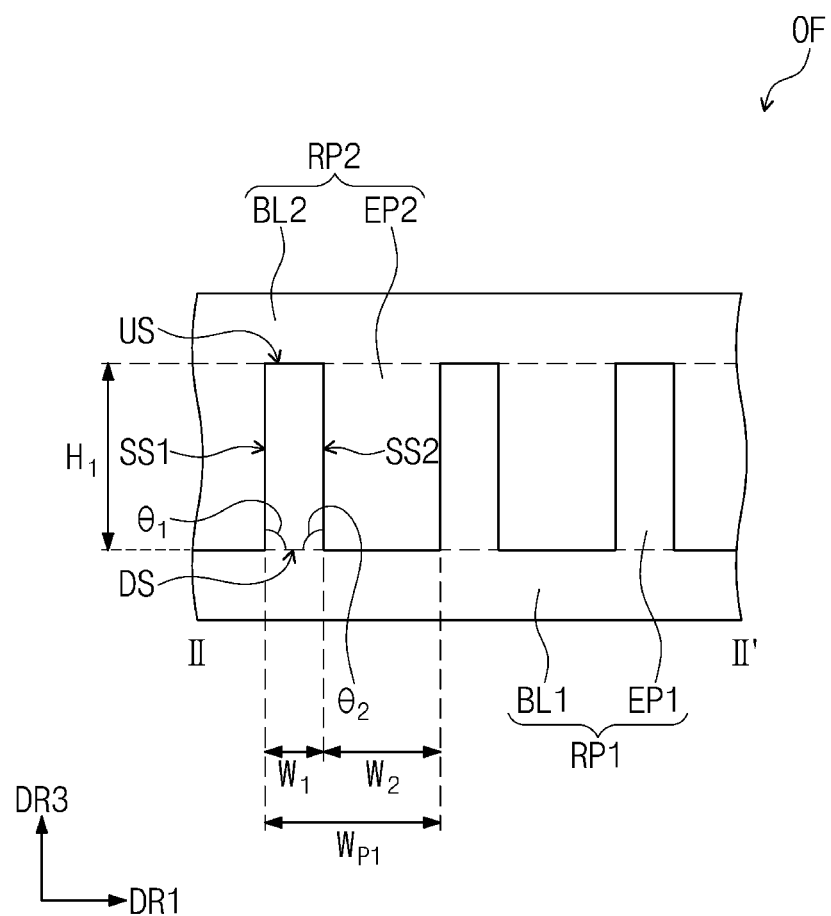
FIG. 6 is a schematic cross-sectional view taken along line II-IF of FIG. 5 illustrating a portion of the optical film according to an embodiment
Figure 7:
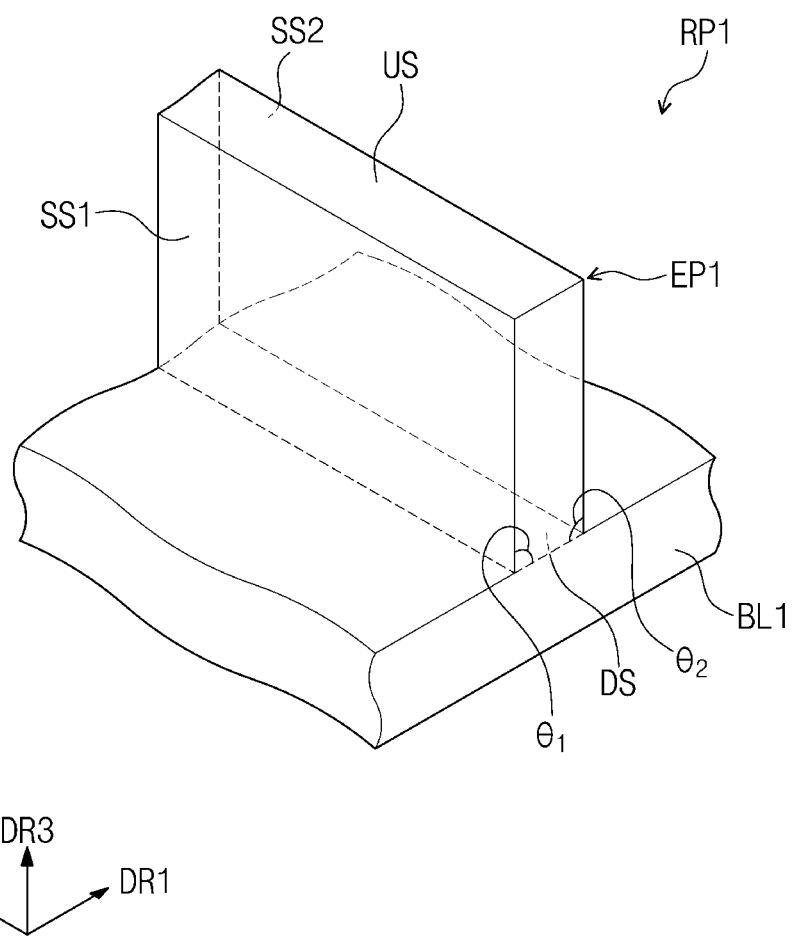
FIG. 7 is a perspective view illustrating a portion of the optical film according to an embodiment

FIG. 5 is an exploded perspective view of an optical film according to an embodiment. FIG. 6 is a schematic cross-sectional view taken along line II-IF of FIG. 5 illustrating a portion of the optical film according to an embodiment, and FIG. 7 is a perspective view illustrating a portion of the optical film according to an embodiment.

An electronic device ED according to an embodiment may be a large-sized electronic device such as a television, a monitor, or an external billboard. The electronic device ED may be a small or medium-sized electronic device such as a personal computer, a notebook computer, a personal digital assistant, a car navigation system, a game machine, a smart phone, a tablet, and a camera. The above-described devices are merely examples, and thus, the display device DD may be applicable to other electronic devices.

The electronic device ED may include a display device DD and a housing HAU. The electronic device ED may display an image IM through a display surface IS. FIG. 1 illustrates an example in which the display surface IS is parallel to a surface defined by a first directional axis DR1 and a second directional axis DR2 crossing the first directional axis DR1. However, this is merely an example. For example, in an embodiment, the display surface IS of the electronic device ED may have a curved shape.

A normal direction of the display surface IS, i.e., a direction, in which the image IM is displayed, of a thickness direction of the electronic device ED is indicated as a third directional axis DR3. A direction opposite to the third directional axis DR3 of the thickness direction of the electronic device ED may be indicated as a fourth directional axis DR4. A front surface (or a top surface) and a rear surface (or a bottom surface) of each of the members may be distinguished by the third directional axis DR3. The directions indicated as the first to fourth directional axes DR1, DR2, DR3, and DR4 may be relative positions or directions and thus may apply to different directions.

The housing HAU may accommodate the display device DD. The housing HAU may be disposed to cover the display device DD so that the top surface that is the display surface IS of the display device DD is exposed. The housing HAU may cover a side surface and a bottom surface of the display device DD and expose an entire top surface of the display device DD. However, the embodiment is not limited thereto. For example, the housing HAU may cover a portion of the top surface of the display device DD as well as the side surface and the bottom surface of the display device DD.

The display device DD may include a light source member LU, a liquid crystal display panel DP, and an optical member OU. The light source member LU may be disposed below the liquid crystal display panel DP, and the optical member OU may be disposed above the liquid crystal display panel DP.

In the display device DD according to an embodiment, the optical member OU may include an optical film OF. The optical film OF may be disposed above the liquid crystal display panel DP. The optical member OU may include the optical film OF and a base film BS supporting the optical film OF.

FIG. 4 is a schematic cross-sectional view of the light source member LU according to an embodiment. The light source member LU according to an embodiment may include a light source LS and functional layers FL that transmit light emitted from the light source LS to the liquid crystal display panel DP. The functional layers FL may include a guide panel GP, a low-refractive index layer LRL disposed on the guide panel GP, and a light conversion layer CCL disposed on the low-refractive index layer LRL. The light source LS may be disposed on at least one side of the guide panel GP. The light source member LU may further include a barrier layer disposed on the color conversion layer CCL. Emission pattern parts CP may be disposed on a bottom surface of the guide panel GP.

In the light source member LU according to an embodiment, the light source LS may include a circuit board PB and light emitting element packages LD disposed on the circuit board PB. The light emitting element packages LD may emit light having the same wavelength range. The light source LS may include light emitting element packages LD that emit light having wavelength ranges different from each other. In an embodiment, the light emitting element packages LD may emit first light having a central wavelength in a wavelength range of about 440 nm to about 460 nm. In an embodiment, the light emitting element packages LD may emit blue light.

Although the light source LS according to an embodiment may be disposed adjacent to one side surface of the guide panel GP in FIG. 2, the embodiment is not limited thereto. For example, the light source LS may be disposed on the side surfaces of the guide panel GP.

Although not illustrated, the light source LS may be disposed on a lower portion of the guide panel GP. For example, the light source LS may be a direct type light source.

The guide panel GP may be a glass substrate. However, the embodiment is not limited thereto. For example, the guide panel GP may be a transparent resin substrate. For example, the guide panel GP may include an acrylic-based resin or any other suitable material as would be appreciated and understood by one of ordinary skill in the art.

The emission pattern parts CP disposed on the bottom surface of the guide panel GP may transmit light incident from the light source LS into one side surface of the guide panel GP to the other side surface of the guide panel GP or change a direction of the incident light so that the light incident toward the bottom surface of the guide panel GP may be transmitted toward an emission surface that is the top surface of the guide panel GP.

The low-refractive index layer LRL may be disposed on the guide panel GP. The low-refractive index layer LRL may be directly disposed on the guide panel GP. The low-refractive index layer LRL may have a refractive index approximately less than that of the guide panel GP. The low-refractive index layer LRL may have a refractive index approximately less than that of the guide panel GP to effectively transmit the light, which is incident from the light source LS to the guide panel GP, to the other side surface of the guide panel GP, which may be relatively spaced apart from the light source LS. For example, the guide panel GP and the low-refractive index layer LRL disposed on the guide panel GP may function as a light guide plate in the light source member LU.

The light source member LU may include the color conversion layer CCL disposed on the low-refractive index layer LRL. The color conversion layer CCL may convert a color of the light provided from the light source LS to the liquid crystal display panel DP. For example, the light provided from the light source LS may pass through the color conversion layer CCL and then be provided to or incident upon the liquid crystal display panel DP as white light. In an embodiment, the color conversion layer CCL may include quantum dots QD1 and QD2 that covert the incident light into light having wavelengths different from each other. When the light provided from the light source LS is the first light having the blue wavelength region, the color conversion layer CCL may include a first quantum dot QD1 that is excited by the blue light to emit green light and a second quantum dot QD2 that is excited by the blue light to emit red light.

The barrier layer CPL may be disposed on the color conversion layer CCL. The barrier layer CPL may prevent moisture and/or oxygen (hereinafter, referred to as 'moisture/oxygen') from being permeated or introduced into the color conversion layer CCL. The barrier layer CPL may cover the color conversion layer CCL.

The liquid crystal display panel DP may be disposed on the light source member LU. The liquid crystal display panel DP may include first and second substrates SUB1 and SUB2, which may face each other, and a liquid crystal layer LCL disposed between the first and second substrates SUB1 and SUB2.

The liquid crystal display panel DP may be divided into a display area DA and a peripheral area NDA, or non-display area, surrounding the display area DA. The display area DA may be an area on which an image is displayed on a plane thereof, and the peripheral area NDA may be an area which is adjacent to the display area DA and on which an image is not displayed on a plane thereof. The liquid crystal display panel DP may include pixels disposed on the display area DA.

A signal line and a pixel circuit of the pixels may be disposed on one (hereinafter, referred to as an array substrate) of the first substrate SUB1 and the second substrate SUB2. The array substrate may be connected to a main circuit board through a chip on film (COF) manner. A central control circuit that drives the liquid crystal display panel DP may be disposed on the main circuit board. The central control circuit may be a microprocessor. The COF may be a data driving circuit. A gate driving circuit may be mounted on the array substrate and integrated with the array substrate in the form of a low temperature polysilicon (LTPS).

The liquid crystal layer LCL includes liquid crystal. In an embodiment, the liquid crystal layer LCL of the liquid crystal display panel DP may include vertically aligned liquid crystal. The liquid crystal contained in the liquid crystal layer LCL may be vertically aligned with respect to the first substrate SUB1 and the second substrate SUB2. For example, in an embodiment, the liquid crystal may be aligned at an inclined angle in a range of about 88° to 90° with respect to a top surface of the first substrate SUB1 or a bottom surface of the second substrate SUB2. In the display device DD according to an embodiment, the liquid crystal display panel DP may be a liquid crystal display panel having a vertical alignment mode.

The embodiment is not limited thereto. For example, in the display device DD according to an embodiment, the liquid crystal display panel DP may include various types of display panels having a twisted nematic (TN) mode, a horizontal alignment mode, a super vertical alignment (SVA) mode, a super patterned vertical alignment (S-PVA) mode, an optically compensated bend (OCB) mode, an electrically controlled birefringence (ECB) mode, and other modes as would be appreciated and understood by one of ordinary skill in the art. The liquid crystal display panel DP may have a driving method of the display panel and an alignment direction manner of the liquid crystal molecules, which are different from those exemplified as described above.

The liquid crystal display panel DP may include polarizing layers POL-T and POL-B. In FIG. 3, a lower polarizing layer POL-B may be disposed on a lower portion of the first substrate SUB1 that is a lower substrate of the liquid crystal display panel DP and an upper polarizing layer POL-T disposed on the second substrate SUB2 that is an upper substrate of the liquid crystal display panel DP are illustrated.

Each of the polarizing layers POL-T and POL-B may include a linear polarizer. The linear polarizer may linearly polarize the provided or incident light in one direction. The linear polarizer may be a film type polarizer including an elongated polymer film. For example, the elongated polymer film may be a polyvinylalcohol-based film. The linear polarizer may be a coating-type polarizing layer.

Although not illustrated, each of the polarizing layers POL-T and POL-B may be an in-cell type polarizing layer that is independently provided between the first substrate SUB1 and the liquid crystal layer LCL or between the second substrate SUB2 and the liquid crystal layer LCL.

For example, the lower polarizing layer POL-B may be a coating-type polarizing layer or a polarizing layer formed through deposition. The lower polarizing layer POL-B may be formed by applying a material containing a dichroic dye and a liquid crystal compound. By way of example, the lower polarizing layer POL-B may include a wire grid-type polarizing layer. The lower polarizing layer POL-B may be provided in a film type and disposed in a lower portion of the liquid crystal display panel DP. An adhesion layer may be further disposed between the lower polarizing layer POL-B and the first substrate SUB1.

The lower polarizing layer POL-B may be a coating-type polarizing layer or a polarizing layer formed through deposition.

A transmission axis of the linear polarizer provided in the upper polarizing layer POL-T disposed on the second substrate SUB2 and a transmission axis of the linear polarizer provided in the lower polarizing layer POL-B may be perpendicular to each other. However, the embodiment is not limited thereto.

Each of the polarizing layers POL-T and POL-B may include a phase retardation layer, a light compensation layer, and the like. The phase retardation layer, the light compensation layer, and the like may be disposed on a top or bottom surface of the linear polarizer. For example, although not illustrated, an adhesion layer may be disposed between the linear polarizer and the phase retardation layer or between the linear polarizer and the light compensation layer.

In the display device DD according to an embodiment, an optical member OU may be disposed on an upper portion of the liquid crystal display panel DP. The optical member OU may include an optical film OF and a base film BS.

The optical film OF may be disposed on the liquid crystal display panel DP. In an embodiment, the optical film OF may be disposed above the upper polarizing layer POL-T. An adhesion layer AD may be disposed between the upper polarizing layer POL-T and the optical film OF.

The base film BS may be disposed on the optical film OF. The base film BS may function as a support body supporting the optical film OF or a protection layer protecting the optical film OF. For example, a polyethylene terephthalate (PET) film may be used as the base film BS.

Referring to FIGS. 5 to 7, the optical film OF according to an embodiment may include a first pattern layer RP1 and a second pattern layer RP2. The second pattern layer RP2 may be disposed on the first pattern layer RP1.

The first pattern layer RP1 and the second pattern layer RP2 may have refractive indexes different from each other. For example, in the display device DD of FIG. 3 according to an embodiment and the optical film OF of FIGS. 5 to 7 according to an embodiment, the first pattern layer RP1 may have a refractive index approximately less than that of the second pattern layer RP2. A difference or an absolute value of the difference between the refractive index of the second pattern layer RP2 and the refractive index of the first pattern layer RP1 may be about 0.2 or more. The first pattern layer RP1 may have a refractive index in a range of about 1.0 to about 1.5, and the second pattern layer RP2 may have a refractive index in a range of about 1.2 to about 1.7. For example, the second pattern layer RP2 may have a refractive index of about 1.6 or less, and the first pattern layer RP1 may have a refractive index of about 1.4 or less. Here, the refractive index of the second pattern layer RP2 may be greater than about 0.2 to 0.25 or more than that of the first pattern layer RP1.

In the optical film OF, the first pattern layer RP1 may include a first base part BL1 and first protrusions EP1. The first protrusions EP1 may be disposed to be aligned on the first base part BL1. The second pattern layer RP2 may be disposed on the first patter layer RP1, and the second pattern layer RP2 may be filled between the first protrusions EP1.

Referring to FIGS. 3, 5, and 6, in the optical film OF according to an embodiment, the second pattern layer RP2 may include a second base part BL2 and second protrusions EP2. In the optical film OF according to an embodiment, the second protrusions EP2 may be disposed to be aligned below the second base part BL2. In the optical film OF according to an embodiment, the first protrusions EP1 and the second protrusions EP2 may be arranged as alternately repeated.

In an embodiment, each of the first and second protrusions EP1 and EP2 may extend in one direction and may be disposed in a stripe shape. Each of the first protrusions EP1 and the second protrusions EP2 may be disposed in the form of a stripe pattern on a plane defined by the first directional axis DR1 and the second directional axis DR2.

Referring to FIG. 5, the first protrusions EP1 and the second protrusions EP2 may extend in the direction of the second directional axis DR2, respectively. Referring to FIGS. 1 to 5, the extension direction of the protrusions EP1 and EP2 of the optical film OF may be substantially parallel to a vertical direction in a direction facing the display surface IS of the electronic device ED. The terms "face" and "facing" mean that a first element may directly or indirectly oppose a second element. In a case in which an element intervenes between a first and second element, or a couple of elements, the first and second element may be understood as being indirectly opposed to one another, although still facing each other. The term "overlap" may include layer, stack, face or facing, extending over, covering or partly covering or any other suitable term as would be appreciated and understood by those of ordinary skill in the art. When an element is described as 'not overlapping' or 'to not overlap' another element, this may include that the elements are spaced apart from each other, offset from each other, or set aside from each other or any other suitable term as would be appreciated and understood by those of ordinary skill in the art. In the display device DD of FIGS. 1 and 2 according to an embodiment, the extension direction of the first and second protrusions EP1 and EP2 of the optical film OF may be substantially parallel to the short side of the display device DD.

Although a horizontal direction of the display surface IS of the electronic device ED is illustrated as the long side, and a vertical direction is illustrated as the short side in FIG. 1, the embodiment is not limited thereto. The horizontal direction of the display surface IS of the electronic device ED may be the short side direction, and the vertical direction may be the long side direction in the direction in which the user views or perceives the electronic device ED. For example, the extension direction of the first and second protrusions EP1 and EP2 of the optical film OF may be a direction that is substantially parallel to the long side of the display device DD.

In the optical film OF according to an embodiment, in the optical film OF, each of the first protrusions EP1 may include a bottom surface DS adjacent to the first base part BL1, a ceiling or upper surface US disposed to face the bottom surface DS, and side surfaces SS1 and SS2 connecting the bottom surface DS to the ceiling or upper surface US. In an embodiment, the side surfaces SS1 and SS2 of each of the first protrusions EP1 may be perpendicular to the bottom surface DS and the ceiling or upper surface US. In the optical film OF according to an embodiment, in the optical film OF, the ceiling or upper surface US may be a surface substantially adjacent to the second base part BL2.

In this specification, the bottom surface DS, the ceiling or upper surface US, and the side surfaces SS1 and SS2 of the first protrusions EP1 may be called a first bottom surface, a first ceiling or upper surface, and a first side surface.

Referring to FIG. 6, in a schematic cross-section that is substantially parallel to a plane defined by the first directional axis DR1 and the third directional axis DR3, the first protrusions EP1 may have a rectangular shape. An inclined angle θ1 with respect to the bottom surface DS of one side surface SS1 of the first protrusions EP1, which defines a first side of the rectangular shape in the cross-section, may be about 90°. An inclined angle θ2 with respect to the bottom surface DS of the other side surface SS2 of the first protrusions EP1 facing the first side in the cross-section may be about 90°.

Each of the first inclined angle θ1 and the second inclined angle θ2 may be substantially close to about 90°. However, the embodiment is not limited thereto. For example, each of the first inclined angle θ1 and the second inclined angle θ2 may be in a range of about 86° to about 90°.

A relationship between the spaced distance $W_{P1}$ between the adjacent first protrusions EP1 in the cross-section of the first protrusions EP1, which may be substantially perpendicular to the first base part BL1, and the width $W_1$ of each of the first protrusions EP1 may be expressed as the following Equation 1.

$$0.15 \leq W_1/W_{P1} \leq 0.45 \qquad \text{[Equation 1]}$$

In Equation 1, the spaced distance $W_{P1}$ between adjacent first protrusions EP1 in the cross-section of the first protrusions EP1 may be the sum of the width $W_1$ of each of the first protrusions EP1 and a minimally spaced distance $W_2$ between the adjacent first protrusions EP1. $W_1$ and $W_2$ may correspond to distances in a direction perpendicular to the extension direction of the first protrusions EP1. Referring to FIG. 6, the spaced distance $W_{P1}$ between the adjacent first protrusions EP1 and the width $W_1$ of each of the first protrusions EP1 may indicate distances in the direction parallel to the first directional axis DR1.

For example, the width $W_1$ of the first protrusions EP1 may be in a range of about 3 μm to about 5 μm. The spaced distance $W_{P1}$ between adjacent first protrusions EP1 in the cross-section of the first protrusions EP1 may be in a range of about 12 μm to about 16 μm.

A relationship between the spaced distance $W_{P1}$ between the adjacent first protrusions EP1 in the cross-section of the first protrusions EP1, which may be substantially perpendicular to the first base part BL1, and the height $H_1$ of each of the first protrusions EP1 may be expressed as the following Equation 2.

$$0.75 \leq H_1/W_{P1} \leq 1.35 \qquad \text{[Equation 2]}$$

As shown in above-described Equation 1, in Equation 2, $W_{P1}$ may be the sum of the width $W_1$ of each of the first protrusions EP1 and a minimally spaced distance $W_2$ between the adjacent first protrusions EP1, and all $W_1$ and $W_2$ may correspond to distances in a direction substantially perpendicular to the extension direction of the first protrusions EP1. The height $H_1$ of the first protrusions EP1 may correspond to a height in the third directional axis DR3, that is, the thickness direction of the optical film OF.

For example, the spaced distance $W_{P1}$ between the first protrusions EP1 may be in a range of about 12 μm to about 16 μm, and the height $H_1$ of each of the first protrusions EP1 may be in a range of about 12 μm to about 16 μm.

Referring to FIG. 5, the first pattern layer RP1 may include first protrusions EP1, and a first concave part CP1 may be defined or disposed between the adjacent first protrusions EP1. The second pattern layer RP2 may include second protrusions EP2 and a second concave part CP2 that may be defined or disposed between the second protrusions EP2.

A groove may be formed by or defined by each of the first protrusions EP1 and each of the first concave parts CP1 of the first pattern layer RP1 and may correspond to a groove that may be formed by or defined by each of the second concave parts CP2 and each of the second protrusions EP2 of the second pattern layer RP2. For example, the first protrusions EP1 of the first pattern layer RP1 may be disposed to correspond to the second concave parts CP2 of the second pattern layer RP2, and the second protrusions EP2 of the second pattern layer RP2 may be disposed to correspond to the first concave parts CP1 of the first pattern layer RP1. For example, each of the first protrusions EP1 may be disposed to be inserted into each of the second concave parts CP2, and each of the second protrusions EP2 may be disposed to be inserted into the first concave parts CP1.

In the optical film OF according to an embodiment as illustrated in FIGS. 5 to 7, the side surfaces SS1 and SS2 of the first protrusions EP1 may be substantially perpendicular to the bottom surface DS, and the dimensions of the first protrusions EP1 may satisfy Equations 1 and 2.

The display device DD including the optical film OF according to an embodiment may have superior visibility. For example, the display device DD including the optical film OF according to an embodiment may increase a light emission amount of white light in the front direction and a contrast ratio and may be improved in gamma distortion index (GDI) value in a direction of a side viewing angle of about 60° to realize superior display quality.

TABLE 1

| Classification | Comparative Example | Embodiment |
|---|---|---|
| White Light Brightness | 300 | 353 |
| Contrast Ratio (Contrast Ratio) | 4459 | 5810 |

Table 1 shows results obtained by comparing characteristics of display quality in an embodiment in which the structure of the display device DD of FIG. 3 according to an embodiment is provided and a Comparative Example in which the cross-section of the first protrusions has a trapezoidal shape. With respect to the Comparative Example, the side surface of the first protrusions has an inclined angle of about 80° with respect to the bottom surface in the trapezoidal shape, that is, the cross-sectional shape of the first protrusions in the optical film. In the evaluation of Table 1, the brightness of the white light and the contrast ratio in the front direction were compared under the same set of conditions except that the optical films according to the Comparative Example and the embodiment have different shapes.

Referring to the results of Table 1, in reference to the embodiment, it may be seen that the brightness of the white light increases, and the contrast ratio increases in the front direction as compared with those according to the Comparative Example. For example, when the side surface of the first protrusions is disposed substantially perpendicular to the bottom surface in the pattern layer constituting the optical film, it may be seen that the display quality on the front surface of the display device is improved.

In the embodiment in which the structure of the display device DD of FIG. 3 is provided, Table 2 shows the results obtained by comparing the GDI values according to a variation in height $H_1$ of the first protrusions EP1 when the width $W_1$ of the first protrusions EP1 is about 4 μm, and the spaced distance $W_{P1}$ between the adjacent first protrusions EP1 is about 12 μm. In the results of Table 2, a difference in refractive index of the first pattern layer RP1 and the second pattern layer RP2 is about 0.2.

TABLE 2

| | Height (μm) | | | | | | |
|---|---|---|---|---|---|---|---|
| Classification | 8 | 9 | 10 | 11 | 12 | 14 | 16 |
| GDI | 0.239 | 0.229 | 0.220 | 0.213 | 0.206 | 0.196 | 0.199 |

Referring to the results of Table 2, when the height $H_1$ of the first protrusions EP1 ranges from about 12 μm to about 16 μm, it may be seen that the good (low) GDI value of about 0.2 is obtained.

In the embodiment in which the structure of the display device DD of FIG. 3 is provided, Table 3 shows the results obtained by comparing the GDI values according to a variation in width $W_1$ of the first protrusions EP1 when the height $H_1$ of the first protrusions EP1 is about 14 μm, and the spaced distance $W_{P1}$ between the adjacent first protrusions EP1 is about 12 μm. In embodiment, which shows the results of Table 3, a difference in refractive index of the first pattern layer RP1 and the second pattern layer RP2 is about 0.2.

TABLE 3

| | Width (μm) | | | | | | |
|---|---|---|---|---|---|---|---|
| Classification | 2 | 3 | 4 | 5 | 6 | 7 | 8 |
| GDI | 0.255 | 0.214 | 0.196 | 0.212 | 0.229 | 0.248 | 0.273 |

Referring to the results of Table 3, when the width $W_1$ of the first protrusions EP1 ranges from about 3 μm to about 5 μm, the GDI value was improved. The GDI value in Tables 2 and 3 represents a value in a direction of a viewing angle of about 60°.

Referring to the results of Table 2 and 3, in the display device DD according to an embodiment, when the spaced distance $W_{P1}$ between the adjacent first protrusions EP1 of the optical film OF is about 12 μm, and the width $W_1$ of the first protrusions EP1 ranges from about 3 μm to about 5 μm and when the spaced distance $W_{P1}$ between the adjacent first protrusions EP1 is about 12 μm, and the height $H_1$ of the first protrusions EP1 ranges from about 12 μm to about 16 μm, it may be seen that superior display quality is realized in the direction of the side viewing angle through a low GDI value.

In the display device according to an embodiment, when the optical film includes the pattern layer including the first protrusions, a ratio of the width $W_1$ of each of the first protrusions to the spaced distance $W_{P1}$ between the adjacent first protrusions ranges from about 0.15 to 0.45, and a ratio of the height $H_1$ of each of the first protrusions to the spaced distance $W_{P1}$ between the first protrusions ranges from about 0.75 to 1.35, it may be seen that superior visibility is realized. Although the structure of the embodiment of FIG. 3 has been mainly described in reference to the Tables, similar results may be obtained with other embodiments.

For example, when considering the evaluation results of Tables 1 to 3, when the side surfaces SS1 and SS2 of the first protrusions EP1 are substantially perpendicular to the bottom surface DS in the cross-section of the optical film OF, a ratio of the width $W_1$ of each of the first protrusions to the spaced distance $W_{P1}$ between the adjacent first protrusions ranges from about 0.15 to about 0.45, and a ratio of the height $H_1$ of each of the first protrusions to the spaced distance $W_{P1}$ between the first protrusions ranges from about 0.75 to about 1.35, it may be confirmed that superior brightness characteristics and contrast ratio characteristics are realized, and superior visibility even in the direction of the side viewing angle is realized.

Figure 8:
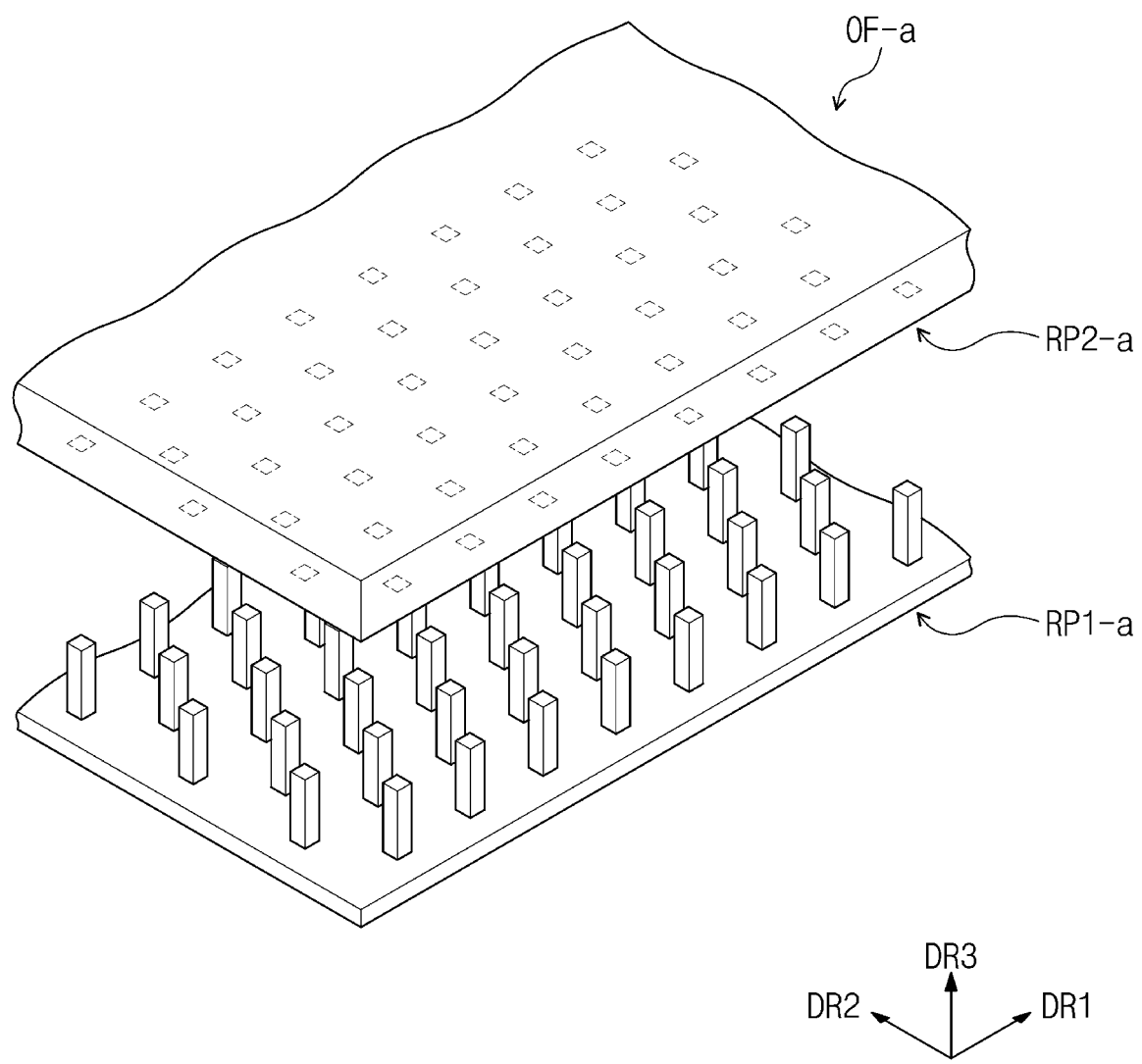
FIG. 8 is an exploded perspective view of an optical film according to an embodiment
Figure 9:
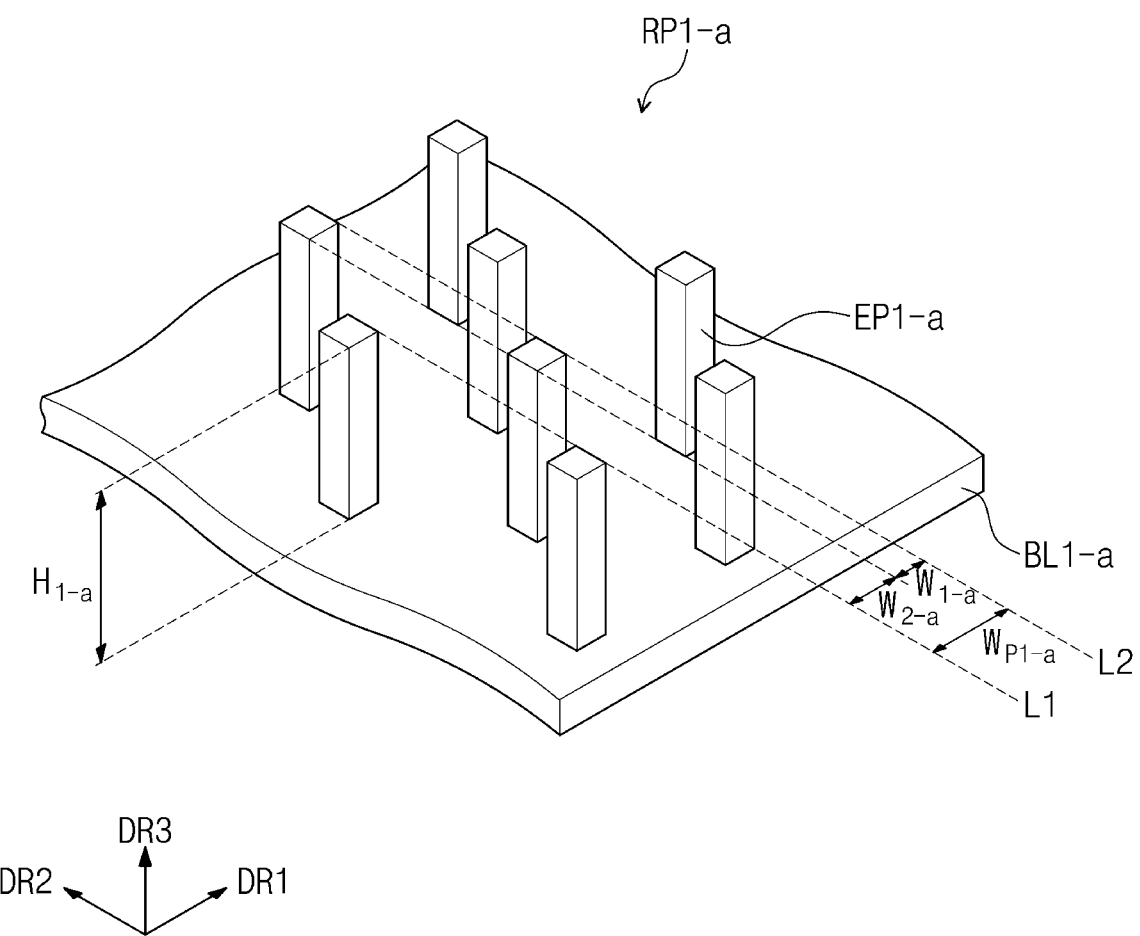
FIG. 9 is a perspective view illustrating a portion of the optical film according to an embodiment
Figure 10:
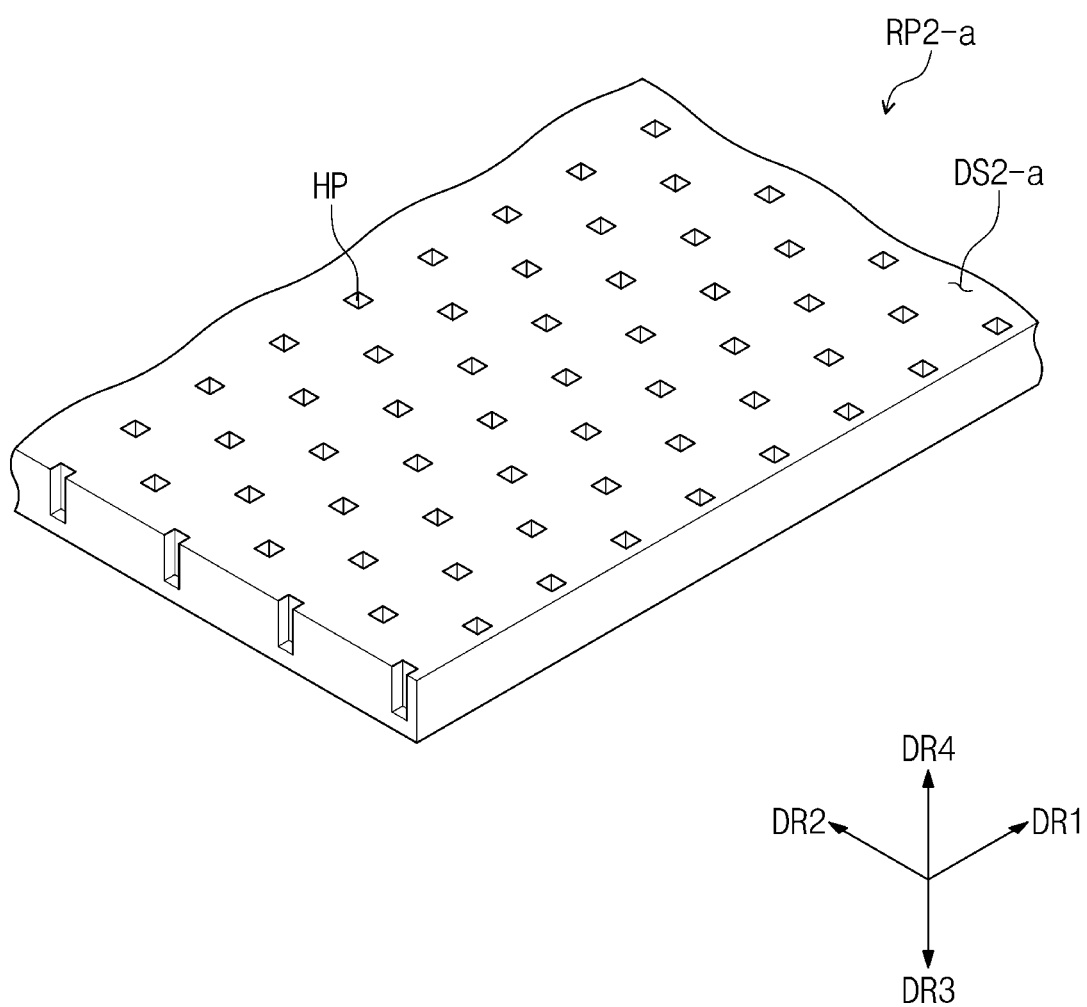
FIG. 10 is a perspective view illustrating a portion of the optical film according to an embodiment

FIG. 8 is an exploded perspective view of an optical film according to an embodiment, FIG. 9 is a perspective view illustrating a portion of the optical film according to an embodiment, and FIG. 10 is a perspective view illustrating a portion of the optical film according to an embodiment.

Hereinafter, an optical film OF-a according to an embodiment may be provided in the display device of FIGS. 1 to 3 according to an embodiment.

Referring to FIG. 8, the optical film OF-a according to an embodiment may include a first pattern layer RP1-a and a second pattern layer RP2-a disposed on the first pattern layer RP1-a. The first pattern layer RP1-a may include a first base part BL1-a and first protrusions EP1-a as shown in FIG. 9. Referring to FIG. 9, each of the first protrusions EP1-a of the first pattern layer RP1-a may have a substantially rectangular pillar shape having a height $H_1$, in the third directional axis DR3, that is, the thickness direction.

Referring to FIG. 10, in an embodiment, the second pattern layer RP2-a may include cavities HP defined in one surface DS2-a. The cavities may be grooves, apertures, or spaces, by way of non-limiting example. The first protrusions EP1-a of the first pattern layer RP1-a may be disposed in a one-to-one correspondence with respect to the cavities HP of the second pattern layer RP2-a. The first protrusions EP1-a of the first pattern layer RP1-a may be disposed to fill the cavities HP of the second pattern layer RP2-a. It should also be noted that the first protrusions EP1-a and cavities HP are not limited to the first and second pattern layers RP1-a and RP2-a, respectively. In other words, protrusions may be disposed on the second pattern layer RP2-a and cavities may be disposed/defined in the first pattern layer RP1-a.

In the optical film OF-a of FIGS. 8 to 10 according to an embodiment, the first pattern layer RP1-a may have a refractive index approximately less than that of the second pattern layer RP2-a. A difference between the refractive index of the first pattern layer RP1-a and the refractive index of the second pattern layer RP2-a may be about 0.2 or more.

The first protrusions EP1-a may be disposed to form a column in the second directional axis DR2. A spaced distance $W_{P1}$, between the first protrusions EP1-a forming a first column L1 and the first protrusions EP1-a forming a second column L2 adjacent to the first column L1 may range from about 12 μm to about 16 μm. A width $W_{1-a}$ of each of the first protrusions EP1-a in the first directional axis DR1 may range from about 3 μm to about 5 μm.

A relationship between the spaced distance $W_{P1}$, between the adjacent first protrusions EP1-a in the cross-section of the first protrusions EP1-a, which is substantially perpendicular to the first base part BL1-a, and the width $W_{1-a}$ of each of the first protrusions EP1-a may be expressed as in the following Equation 1-1.

$$0.15 \leq W_{1-a}/W_{P1-a} \leq 0.45 \qquad \text{Equation 1-1}$$

In Equation 1-1, the spaced distance $W_{P1-a}$ between the first protrusions EP1-a may be the sum of the width $W_{1-a}$ of each of the first protrusions EP1 and a minimally spaced distance $W_{2-a}$ between lines in which the first protrusions EP1-a are arranged in the second directional axis DR2. Referring to FIG. 9, the spaced distance $W_{P1-a}$ between the adjacent first protrusions EP1-a may be a distance between the first protrusions EP1-a, which are disposed in the adjacent columns L1 and L2. The columns L1 and L2 may be virtual lines in which the first protrusions EP1-a may be aligned in the direction of the second directional axis DR2.

A relationship between the spaced distance $W_{P1-a}$ between the first protrusions EP1-a forming the first column L1 and the first protrusions EP1-a forming the second column L2 adjacent to the first column L1 in the first directional axis DR1 in the cross-section substantially perpendicular to the first base part BL1-a and the height $H_1$, of each of the first protrusions EP1-a may be expressed as in the following Equation 2-1.

$$0.75 \leq H_{1-a}/W_{P1-a} \leq 1.35 \qquad \text{Equation 2-1}$$

As with the above-described Equation 1-1, the spaced distance $W_{P1}$, in Equation 2-1 is the sum of the width of each of the first protrusions EP1-a and a minimally spaced distance $W_{2-a}$ between columns in which the first protrusions EP1-a are arranged in the second directional axis DR2. The height $H_1$ of the first protrusions EP1-a may correspond to a height in the third directional axis DR3 that is the thickness direction of the optical film OF-a. The height $H_1$, of the first protrusions EP1-a may range from about 12 μm to about 16 μm.

Although not illustrated, in the optical film OF-a according to an embodiment, each of the first protrusions EP1-a may have a cylindrical shape having the height $H_{1-a}$ in the third directional axis DR3, that is, the thickness direction.

As an example, aside from the optical film OF-a described with reference to FIGS. 8 to 10 according to an embodiment, in the optical film including the first pattern layer and the second pattern layer laminated on the first pattern layer according to an embodiment, the first pattern layer may have the shape of the second pattern layer RP2-a of FIG. 10, and the second pattern layer may have the shape of the first pattern layer RP1-a of FIG. 9.

The display device DD of FIGS. 1 to 3, which includes the optical film OF-a of FIGS. 8 to 10, according to an embodiment, improved front brightness characteristics and good viewing angle characteristics may be realized when including the optical film OF of FIGS. 5 to 7 according to an embodiment.

In the optical film OF-a according to an embodiment, the first pattern layer RP1-a may have a refractive index approximately greater than that of the second pattern layer RP2-a. The display device including the optical film OF-a according to an embodiment may be improved in display quality.

Figure 11:
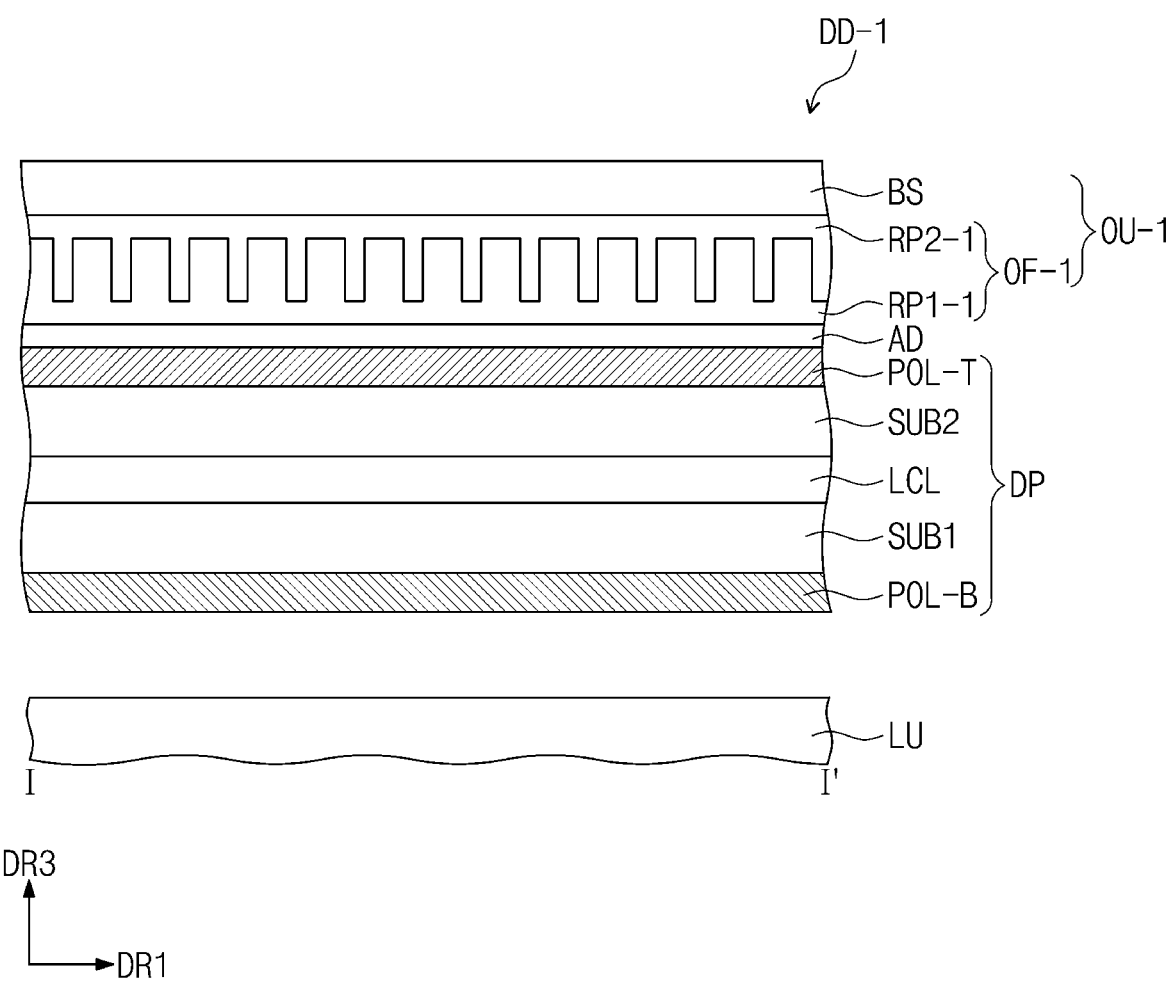
FIG. 11 is a schematic cross-sectional view of a display device according to an embodiment
Figure 12:
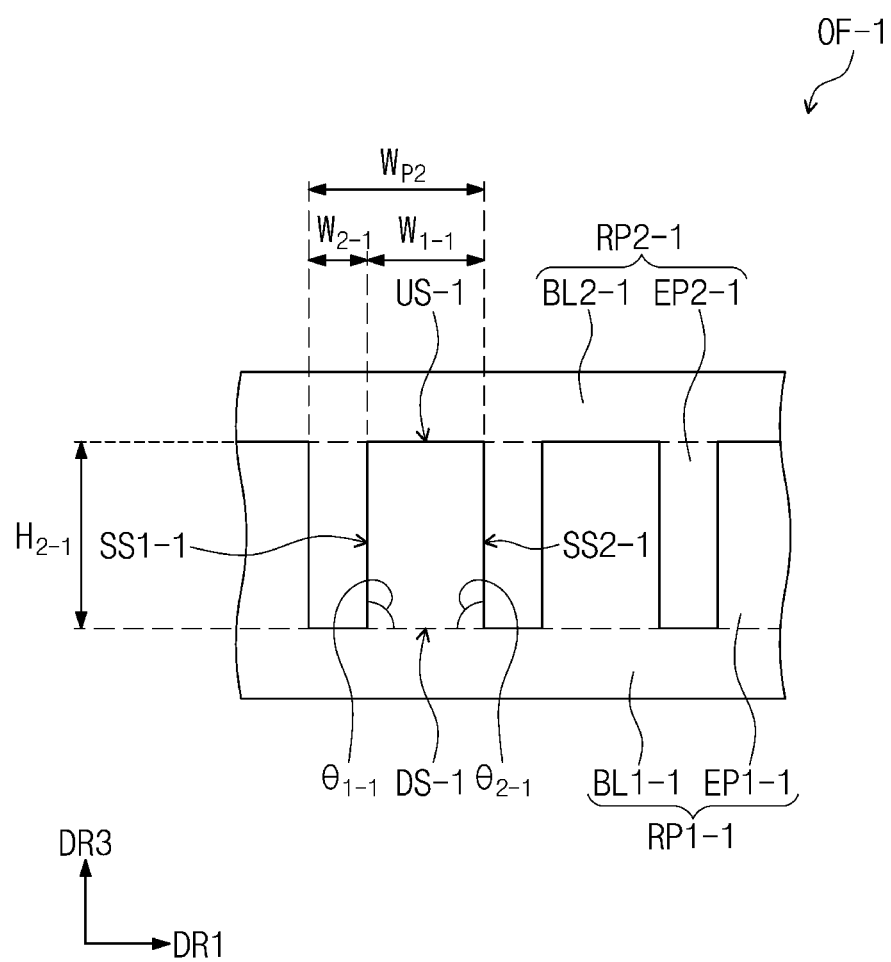
FIG. 12 is a schematic cross-sectional view illustrating a portion of the optical film according to the display device of FIG. 11 according to an embodiment

FIG. 11 is a schematic cross-sectional view illustrating a display device DD-1 according to an embodiment FIG. 12 is a schematic cross-sectional view illustrating a portion of an optical film OF-1 provided in the display device DD-1 of FIG. 11 according to an embodiment Hereinafter, in descriptions of the display device DD-1 and the optical film OF-1 of FIGS. 11 and 12, contents duplicated with those described with reference to FIGS. 1 to 10 will be omitted, and thus, their differences will be mainly described.

The display device DD-1 of FIG. 11 according to an embodiment is different from the display device DD of FIG. 3 according to an embodiment with respect to a combination of a first pattern layer RP1-1 and a second pattern layer RP2-1 in the optical film OF-1.

In the optical film OF-1 according to an embodiment, the second pattern layer RP2-1 may be disposed on the first pattern layer RP1-1, and the first pattern layer PR1-1 may have a refractive index approximately greater than that of the second pattern layer RP2-1.

Referring to FIG. 12, in a schematic cross-section that is substantially parallel to a plane defined by the first directional axis DR1 and the third directional axis DR3, the first protrusions EP1-1 may have a substantially rectangular shape. An inclined angle $\theta_{1-1}$ with respect to a bottom surface DS-1 of one side surface SS1-1 of the first protrusions EP1-1, which defines a first side of the rectangular shape in the cross-section, may be about 90°. An inclined angle $\theta_{2-1}$ with respect to the bottom surface DS-1 of the other side surface SS2-1 of the first protrusions EP1-1 facing the first side in the cross-section may be about 90°.

Each of the first inclined angle $\theta_{1-1}$ and the second inclined angle $\theta_{2-1}$ may be substantially close to about 90°. However, the embodiment is not limited thereto. For example, each of the first inclined angle $\theta_{1-1}$ and the second inclined angle $\theta_{2-1}$ may range from about 87° to about 90°.

A relationship between the spaced distance $W_{P2}$ between the adjacent second protrusions EP2-1 in the cross-section of the second protrusions EP2-1, which may be substantially perpendicular to the second base part BL2-1, and the width $W_{2-1}$ of each of the second protrusions EP2-1 may be expressed as in the following Equation 3.

$$0.15 \leq W_{2-1}/W_{P2} \leq 0.45 \qquad \text{Equation 3}$$

In Equation 3, the spaced distance $W_{P2}$ between the second protrusions EP2-1 is the sum of the width $W_{2-1}$ of each of the second protrusions EP2-1 and a minimally spaced distance $W_{1-1}$ between the adjacent second protrusions EP2-1. $W_{2-1}$ and $W_{1-1}$ may correspond to distances in a direction substantially perpendicular to the extension direction of the second protrusions EP2-1. Referring to FIG. 12, the spaced distance $W_{P2}$ between the adjacent second protrusions EP2-1 and the width $W_{2-1}$ of each of the second protrusions EP2-1 may indicate distances in the direction substantially parallel to the first directional axis DR1.

For example, the width $W_{2-1}$ of the second protrusions EP2-1 may range from about 3 μm to about 5 μm. The spaced distance $W_{P2}$ between the second protrusions EP2-1 may range from about 12 μm to about 16 μm.

A relationship between the spaced distance $W_{P2}$ between the adjacent second protrusions EP2-1 in the cross-section of the second protrusions EP2-1, which may be substantially perpendicular to the second base part BL2-1, and the height $H_{2-1}$ of each of the second protrusions EP2-1 may be expressed as in the following Equation 4.

$$0.75 \leq H_{2-1}/W_{P2} \leq 1.35 \qquad \text{Equation 4}$$

As shown in above-described Equation 3, in Equation 4, $W_{P2}$ is the sum of the width $W_{2-1}$ of each of the second protrusions EP2-1 and a minimally spaced distance $W_{1-1}$ between the adjacent second protrusions EP2-1, and all $W_{2-1}$ and $W_{1-1}$ may correspond to distances in a direction substantially perpendicular to the extension direction of the second protrusions EP2-1. The height $H_{2-1}$ of the second protrusions EP2-1 may correspond to a height in the third directional axis DR3 that is the thickness direction of the optical film OF-1.

For example, the spaced distance $W_{P2}$ between the second protrusions EP2-1 may range from about 12 μm to about 16 μm, and the height $H_{2-1}$ of each of the second protrusions EP2-1 may range from about 12 μm to about 16 μm.

In the optical film OF-1 described with reference to FIGS. 11 and 12 according to an embodiment, the side surfaces SS1-1 and SS2-1 of the first protrusions EP1-1 may be substantially perpendicular to the bottom surface DS-1, the second protrusions EP2-1 of the second pattern layer RP2-1 having a refractive index approximately less than that of the first pattern layer RP1-1 may satisfy Equations 3 and 4. The display device DD-1 including the optical film OF-1 according to an embodiment may have superior visibility. For example, the display device DD-1 including the optical film OF-1 according to an embodiment may increase a light emission amount of white light in the front direction and a contrast ratio and may be improved in gamma distortion index (GDI) value in a direction of a side viewing angle of about 60° to realize superior display quality.

Figure 13A:
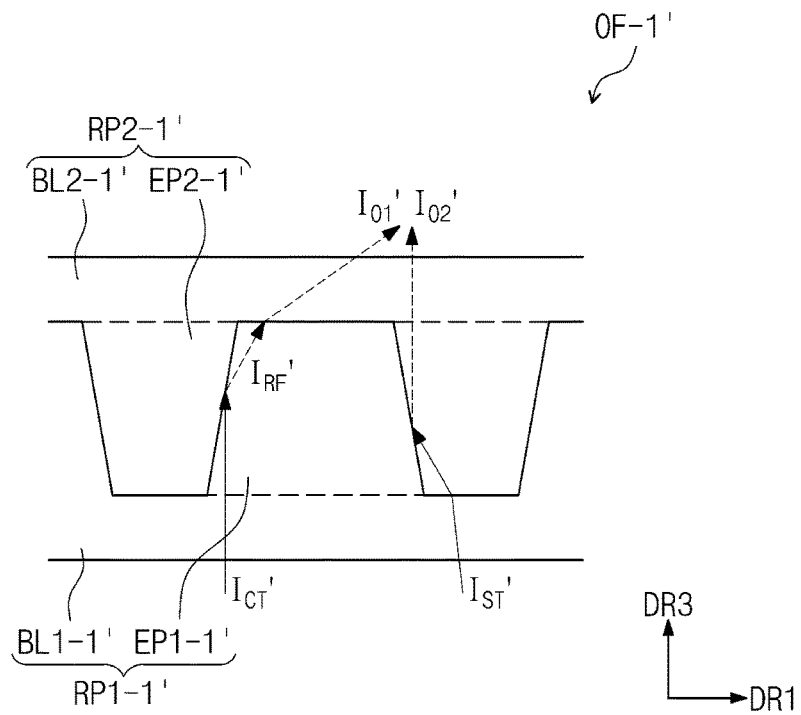
FIGS. 13A and 13B are schematic views illustrating a light traveling path in each of the optical films according to a Comparative Example and Embodiment.

FIG. 13A illustrates an example of a traveling path of light within an optical film OF-1' when a cross-section of a first protrusions EP1-1' has a trapezoidal shape in comparison to the optical film OF-1 of FIG. 12 according to an embodiment. In the cross-section of FIG. 13A, an inclined angle of a side surface of the first protrusions EP1-1' may range from about 80° to about 85°. Light $I_{CT}'$ in a front direction is incident into the optical film OF-1' of FIG. 13A, the incident light $I_{CT}'$ is reflected at a boundary between a first pattern layer RP1-1' and a second pattern layer RP2-1' to be provided to or incident upon the second pattern layer RP2-1' as reflected light $I_{RF}'$. Thus, the light $I_{CT}'$ incident in the front direction is inclined in a side surface direction and emitted as side light $I_{O1}'$. For example, when the optical film OF-1' including the first protrusions EP1-1' having the trapezoidal shape in the cross-section is used, the light $I_{CT}'$ incident into the front surface is emitted as the side light $I_{O1}'$ to reduce an amount of white light in the front direction.

Light $I_{ST}'$ incident into the side surface may be reflected by an inclined surface of the protrusions EP1-1' having the trapezoidal shape in the cross-section and then be emitted as front light $I_{O2}'$. Thus, emission of light in the front direction may increase in a black state to reduce a contrast ratio.

Figure 13B:
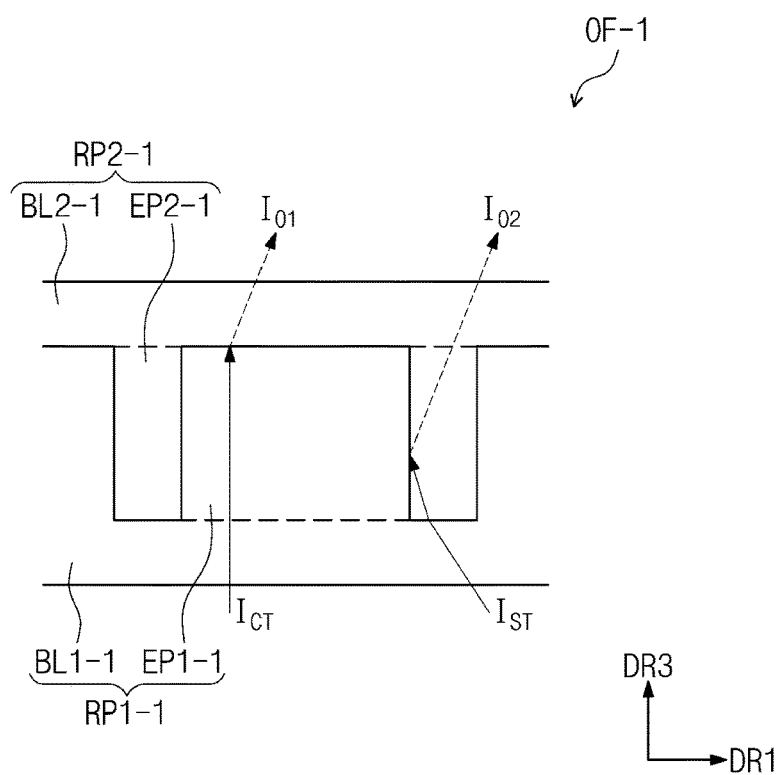

In comparison with this phenomenon, as illustrated in FIG. 13B, in a structure of the optical film OF-1 according to an embodiment, the side surface of the first protrusions EP1-1 is disposed substantially perpendicular to a bottom surface so that the light $I_{CT}$ incident in the front direction may not be reflected by the side surface of the first protrusions EP1-1 but may be incident into the second pattern layer RP2-1 to pass through the second pattern layer RP2-1 to be emitted as the reflected light $I_{O1}$. For example, a portion of the reflected light $I_{O1}$ that is emitted may be changed in direction when compared to the light $I_{CT}$ incident in the front direction due to a difference in refractive index between the first pattern layer RP1-1 and the second pattern layer RP2-1. As an example, an angle of the light incident into the side surface may be reduced, or an amount of light emitted to the side surface may be reduced when compared to the optical film OF-1' having the inclined surface as illustrated in FIG. 13A. Thus, the reduction of the white light in the front direction may be minimized when compared to FIG. 13A.

In the structure of the optical film OF-1 of FIG. 13B according to an embodiment, the light $I_{ST}$ incident into the side surface may be reflected by the inclined surface of the protrusions EP1-1 having a substantially rectangular shape in cross-section and then be emitted as the side light $I_{O2}$. Thus, a ratio of the light $I_{ST}$ incident in the side direction to the light emitted to the front surface may be reduced to increase in contrast ratio of the display device and improve display quality of a side viewing angle.

Figure 14A:
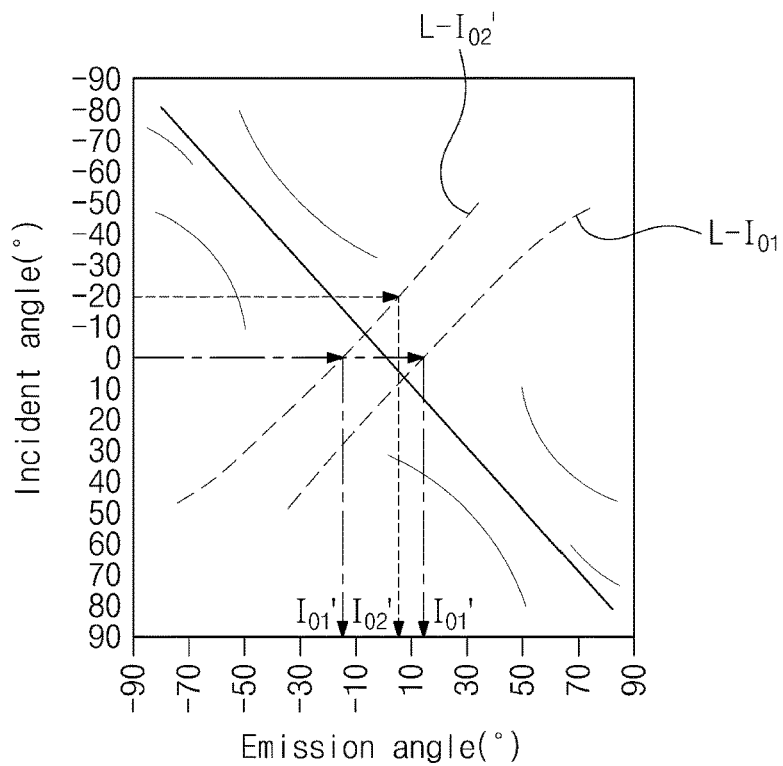
FIG. 14A is a view illustrating optical characteristics with respect to the display device including the optical film having a pattern shape of FIG. 13A.

FIG. 14A illustrates a graphical relationship between an angle of incidence of incident light and an angle of emission of light in the structure of the optical film OF-1' of FIG. 13A according to a Comparative Example. A line indicated by L-$I_{O1}'$ in FIG. 14A corresponds to the light $I_{CT}'$ incident into the front surface emitted as the side light $I_{O1'}$ in FIG. 13A. A line indicated by L-$I_{O2}'$ in FIG. 14A corresponds to the light $I_{ST'}$ incident into the side surface emitted as the front light $I_{O2'}$ in FIG. 13A.

Figure 14B:
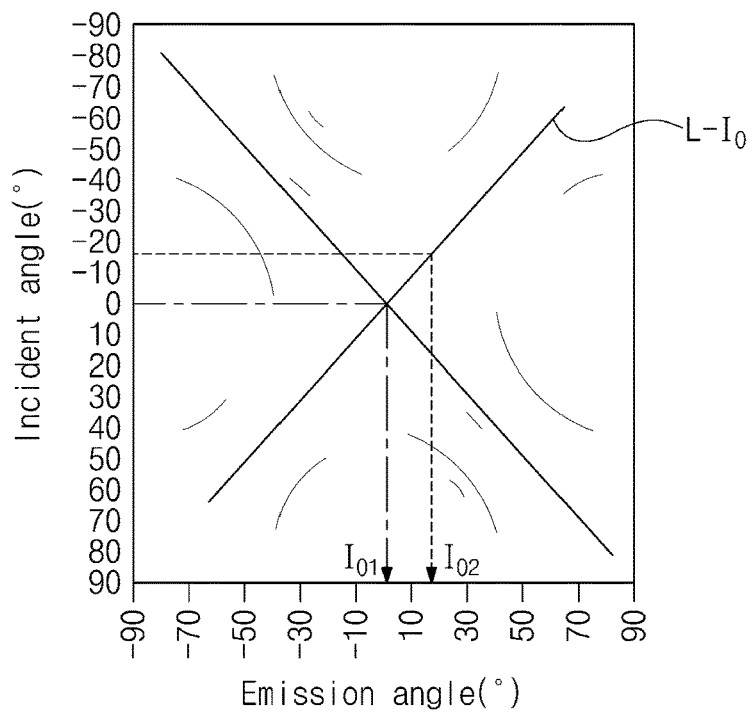
FIG. 14B is a view illustrating optical characteristics with respect to the display device including the optical film having a pattern shape of FIG. 13B.

In contrast, FIG. 14B illustrates a graphical relationship between an angle of incidence of incident light and an angle of emission of light in the structure of the optical film OF-1 according to an embodiment. Referring to FIG. 14B, in the display device including the optical film OF-1 according to an embodiment, when compared to FIG. 14A, no separated lines such as L-$I_{O1}$' and L-$I_{O2}$' are shown, but one light emission line L-$I_O$ is shown. For example, it may be confirmed that the light incident in the front direction is emitted as the front light $I_{O1}$, and the light incident to the side surface is emitted as the side light $I_{O2}$ to prevent the display quality from being deteriorated in the front direction.

In the embodiment of FIG. 11 in which the structure of the display device DD-1 of FIG. 11 is provided, Table 4 shows the results obtained by comparing GDI values according to a variation in height $H_{2-1}$ when the width $W_{2-1}$ of the second protrusions EP2-1 having a refractive index approximately less than that of the first protrusions EP1-1 is about 4 μm, and the spaced distance $W_{P2}$ between the adjacent second protrusions EP2-1 is about 12 μm. In the embodiment of FIG. 11 that shows the results of Table 4, a difference in refractive index of the first pattern layer RP1-1 and the second pattern layer RP2-1 is about 0.2.

TABLE 4

| Classification | Height (μm) | | | | | | |
| --- | --- | --- | --- | --- | --- | --- | --- |
| | 8 | 9 | 10 | 11 | 12 | 14 | 16 |
| GDI | 0.242 | 0.226 | 0.218 | 0.214 | 0.207 | 0.195 | 0.204 |

Referring to the results of Table 4, when the height $H_2$-1 of the second protrusions EP2-1 ranges from about 12 μm to about 16 μm, it is seen that the good (low) GDI value is obtained.

Figure 15:
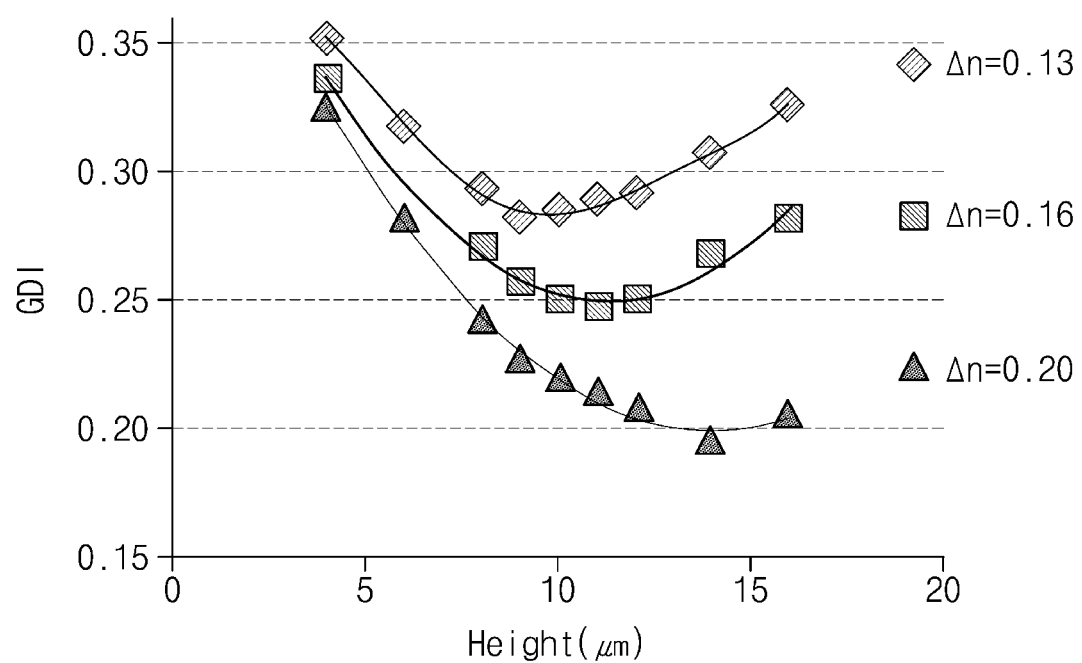
FIG. 15 is a graph of results obtained by comparing GDI values due to a difference in refractive index between the first pattern layer and the second pattern layer of the optical film in the display device of FIG. 11 and illustrates optical characteristics of the display device according to refractive index characteristics in the optical film.

FIG. 15 is a graph of results obtained by comparing GDI values due to a difference in refractive index between the first pattern layer RP1-1 and the second pattern layer RP2-1 of the optical film OF-1 provided in the display device DD-1 of FIG. 11 according to an embodiment. FIG. 15 shows a GDI value according to the difference in refractive index between the first pattern layer PR1-1 and the second pattern layer RP2-1 and the height of the second protrusions EP2-1.

Referring to FIG. 15, it may be seen that the GDI value is lower as the difference in refractive index between the first pattern layer PR1-1 and the second pattern layer RP2-1 increases, and thus, viewing angle characteristics of the display device may be improved. When the difference in refractive index between the first pattern layer PR1-1 and the second pattern layer RP2-1 is about 0.2 or more, it may be confirmed that the good visibility is realized. For example, in the optical film OF-1 according to an embodiment, when the difference in refractive index between the first pattern layer PR1-1 and the second pattern layer RP2-1 is about 0.2 or more, and the height of the second protrusions EP2-1 ranges from about 12 μm to about 16 μm, it may be seen that the good (low) GDI value is obtained.

Figure 16A:
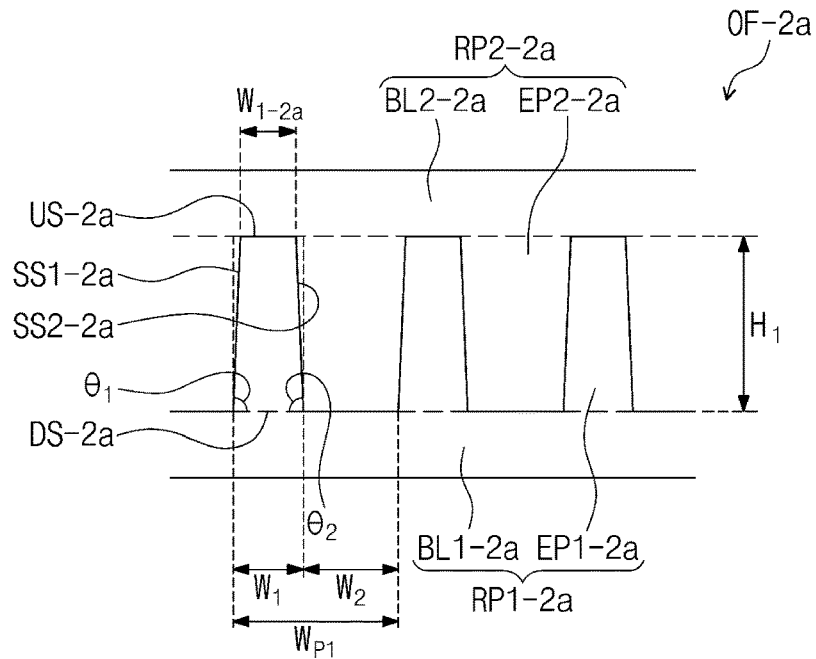
FIGS. 16A and 16B are schematic cross-sectional views of the optical film according to an embodiment
Figure 16B:
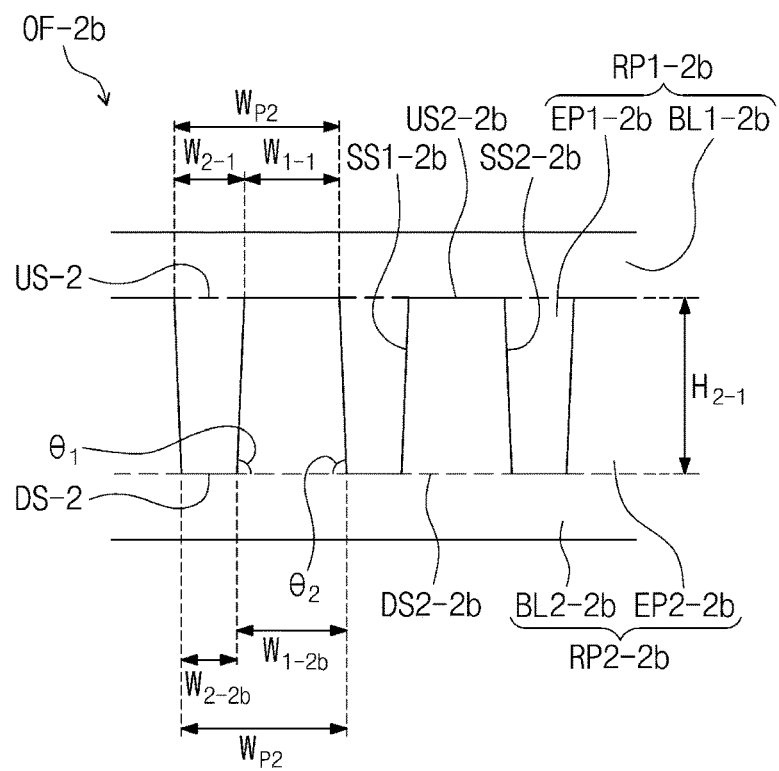

FIGS. 16A and 16B illustrate schematic cross-sectional views of optical films OF-2a and OF-2b when side surfaces SS1-2a, SS2-2a, SS1-2b, and SS2-2b of first and second protrusions EP1-2a and EP2-2b are inclined with respect to bottom surfaces DS-2a and DS-2b according to an embodiment.

In the optical film OF-2a of FIG. 16A according to an embodiment, a second pattern layer RP2-2a may be disposed on a first pattern layer RP1-2a, and the first pattern layer RP1-2a has a refractive index approximately less than that of the second pattern layer RP2-2a. In the optical film OF-2a according to an embodiment, the first pattern layer RP1-2a may include a first base part BL1-2a and first protrusions EP1-2a. The second pattern layer RP2-2a may include a second base part BL2-2a and second protrusions EP2-2a.

The first protrusions EP1-2a may include a first bottom surface DS-2a, a first ceiling or upper surface US-2a, and first side surfaces SS1-2a and SS2-2a. The first bottom surface DS-2a may be substantially adjacent to the first base part BL1-2a, and the first ceiling or upper surface US-2a may be substantially adjacent to the second base part BL2-2a. The first side surfaces SS1-2a and SS2-2a may connect the first bottom surface DS-2a to the first ceiling or upper surface US-2a. In an embodiment, a width $W_1$ of the first bottom surface DS-2a and a width $W_{1-2a}$ of the first ceiling or upper surface US-2a may be different from each other.

In a cross-section of the optical film OF-2a according to an embodiment, each of inclined angles $\theta_1$ and $\theta_2$ of the first side surfaces SS1-2a and SS2-2a with respect to the first bottom surface DS-2a of the first protrusions EP1-2a may be about 86° or more. For example, each of the inclined angles $\theta_1$ and $\theta_2$ may range from about 86° to about 90°.

In the optical film OF-2a of FIG. 16A according to an embodiment, the width of the first ceiling or upper surface US-2a may be reduced in the first protrusions EP1-2a when compared to the optical film OF of FIG. 6 according to an embodiment. The optical film OF-2a according to an embodiment may correspond to a width $W_{1-2a}$ of the first ceiling or upper surface US-2a approximately less than the width $W_1$ of the first bottom surface DS-2a. In the optical film OF-2a according to an embodiment, a relationship between the width $W_1$ of the first bottom surface DS-2a and a spaced distance $W_{P1}$ between the substantially adjacent first bottom surfaces DS-2a of the first protrusions EP1-2a substantially adjacent to the first base part BL1-2a may be expressed as Equation 1 like the optical film OF of FIG. 6 according to an embodiment.

$$0.15 \le W_1/W_{P1} \le 0.45 \quad \text{Equation 1}$$

In the optical film OF-2a of FIG. 16A according to an embodiment, a relationship between the spaced distance $W_{P1}$ between the first protrusions EP1-2a and the height $H_1$ of each of the first protrusions EP1-2a may be expressed as Equation 2.

$$0.75 \le H_1/W_{P1} \le 1.35 \quad \text{Equation 2}$$

Different from the embodiment described with reference to FIG. 16A, in the optical film according to an embodiment, the width of the first bottom surface DS-2a in the first protrusions EP1-2a may be greater than the width $W_1$ of the first protrusions EP1 of FIG. 6 when compared to the optical film OF of FIG. 6 according to an embodiment. In the optical film according to an embodiment, a relationship between the width $W_1$ of the ceiling or upper surface of the first protrusions and the spaced distance $W_{P1}$ between the adjacent ceiling or upper surfaces of the first protrusions substantially adjacent to the second base part may be expressed as Equation 1 like the optical film OF of FIG. 6 according to an embodiment.

$$0.15 \le W_1/W_{P1} \le 0.45 \quad \text{Equation 1}$$

For example, a ratio of the width of the ceiling or upper surface of the first protrusions to the spaced distance between the substantially adjacent ceiling or upper surfaces of the first protrusions substantially adjacent to the first base part may range from about 0.15 to about 0.45.

A ratio of the height of the first protrusions to the spaced distance between the adjacent ceiling or upper surfaces of the first protrusions may range from about 0.75 to about 1.35.

In the optical film OF-2b of FIG. 16B according to an embodiment, the first pattern layer RP1-2b may be disposed on the second pattern layer RP2-2b. For example, in the display device including the optical film OF-2b according to an embodiment, the second pattern layer RP2-2b may be disposed closer to the liquid crystal display panel than the first pattern layer RP1-2b. In the optical film OF-2b of FIG. 16B according to an embodiment, the first pattern layer RP1-2b may have a refractive index approximately less than that of the second pattern layer RP2-2b.

In the optical film OF-2b according to an embodiment, the first pattern layer RP1-2b may include a first base part BL1-2b and first protrusions EP1-2b. The second pattern layer RP2-2b may include a second base part BL2-2b and second protrusions EP2-2b.

Each of the second protrusions EP2-2b may include a second bottom surface DS2-2b substantially adjacent to the second base part BL2-2b, a second ceiling or upper surface US2-2b substantially adjacent to the first base part BL1-2b, and second side surfaces SS1-2b and SS2-2b connecting the second bottom surface DS2-2b to the second ceiling or upper surface US2-2b. In an embodiment, a width $W_{1\text{-}2b}$ of the second bottom surface DS2-2b and a width $W_{1\text{-}1}$ of the second ceiling or upper surface US2-2b may be different from each other.

In a cross-section of the optical film OF-2b according to an embodiment, each of inclined angles $\theta_1$ and $\theta_2$ of the first side surfaces SS1-2b and SS2-2b with respect to the second bottom surface DS2-2b of the second protrusions EP2-2b may be about 87° or more. For example, each of the inclined angles $\theta_1$ and $\theta_2$ may range from about 87° to about 90°.

In the optical film OF-2b of FIG. 16B according to an embodiment, the second pattern layer RP2-2b may correspond to the first pattern layer RP1-1 in the optical film OF-1 of FIG. 12 according to an embodiment. In the optical film OF-2b of FIG. 16B according to an embodiment, the second pattern layer RP2-2b may be a layer having a relatively high refractive index when compared to the first pattern layer RP1-2b, and the first pattern layer RP1-1 of FIG. 12 may be a layer having a relatively high refractive index when compared to the second pattern layer RP2-1.

The second protrusions EP2-2b of the optical film OF-2b according to an embodiment may correspond to the second bottom surface DS2-2b increases in width when compared to the bottom surface DS-1 of the first protrusions EP1-1 of the first pattern layer RP1-1 of FIG. 12. The optical film OF-2b according to an embodiment may correspond to when the width $W_{1\text{-}2b}$ of the second bottom surface DS2-2b is greater than the width $W_{1\text{-}1}$ of the second ceiling or upper surface US2-2b.

In the optical film OF-2b according to an embodiment, a relationship between the width $W_{2\text{-}1}$ of the first ceiling or upper surface US-2 of the first protrusions EP1-2b substantially adjacent to the first base part BL1-2b and the spaced distance $W_{P2}$ between the substantially adjacent first ceiling or upper surfaces US-2 of the first protrusions EP1-2b adjacent to the first base part BL1-2b may be expressed as Equation 3 like the optical film OF-1 of FIG. 12 according to an embodiment. The spaced distance $W_{P2}$ between the adjacent first ceiling or upper surfaces US-2 of the substantially adjacent first protrusions EP1-2b may correspond to the spaced distance $W_{P2}$ of the second protrusions EP2-1 of FIG. 12.

$$0.15 \leq W2\text{-}1/W_{P2} \leq 0.45 \qquad \text{Equation 3}$$

In the optical film OF-2b of FIG. 16B according to an embodiment, a relationship between the spaced distance $W_{P2}$ between the first protrusions EP1-2b and the height $H_{2\text{-}1}$ of each of the first protrusions EP1-2b may be expressed as in Equation 4.

$$0.75 \leq H_{2\text{-}1}/W_{P2} \leq 1.35 \qquad \text{Equation 4}$$

Different from the embodiment described with reference to FIG. 16B, in the optical film according to an embodiment, when compared to the optical film OF-1 of FIG. 12 according to an embodiment, the width $W_{1\text{-}2b}$ of the second bottom surface DS2-2b in the second protrusions EP2-2b may be greater than the width $W_{1\text{-}1}$ of the first protrusions EP1-1 of FIG. 12. In the optical film according to an embodiment, a relationship between the width $W_{2\text{-}2b}$ of the first protrusions EP1-2b adjacent to the second base part BL2-2b and the spaced distance $W_{P2}$ between the adjacent bottom surfaces DS-2 of the first protrusions EP1-2b adjacent to the second base part BL2-2b may be expressed as in Equation 3 like the optical film OF-1 of FIG. 12 according to an embodiment.

$$0.15 \leq W_{2\text{-}2b}/W_{P2} \leq 0.45 \qquad \text{Equation 3}$$

For example, a ratio of the width of the bottom surface of the first protrusions to the spaced distance between the adjacent bottom surfaces of the first protrusions adjacent to the first base part may range from about 0.15 to about 0.45.

A ratio of the height of the first protrusions to the spaced distance between the adjacent bottom surfaces of the first protrusions may range from about 0.75 to about 1.35.

Figure 17A:
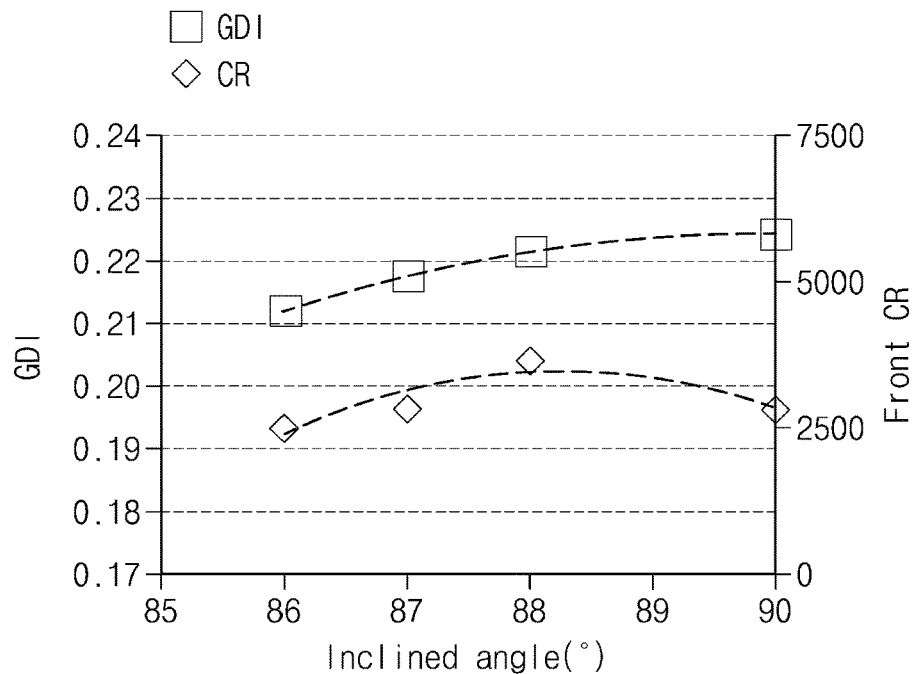
FIG. 17A is a graph showing optical characteristics in the display device including the optical film of FIG. 16A according to an embodiment

FIG. 17A illustrates a graphical relationship of a contrast ratio of a front surface (a front CR) and a GDI value at a side viewing angle of about 60° in the display device including the optical film OF-2a of FIG. 16A according to an embodiment. In FIG. 17A, the front CR value and the GDI value at the side viewing angle according to a variation in inclined angle of the first side surfaces SS1-2a and SS2-2a of the first protrusions EP1-2a are shown.

Referring to results of FIG. 17A, it may be confirmed that a low GDI and a high front CR value are obtained in the range of the inclined angle in a range of about 86° to about 90°. For example, it may be confirmed that the display device has superior display quality in the range of the inclined angle from that of about 86° to about 90°.

Figure 17B:
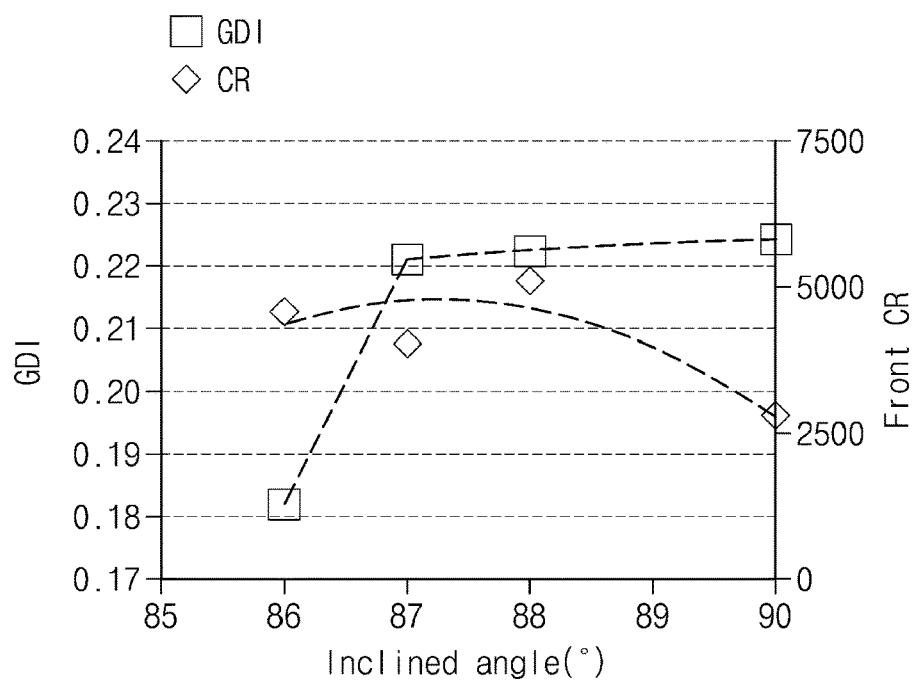
FIG. 17B is a graph showing optical characteristics in the display device including the optical film of FIG. 16B according to an embodiment and FIG. 18 is a schematic cross-sectional view of a display device according to an embodiment

FIG. 17B illustrates a graphical relationship of a contrast ratio of a front surface (a front CR) and a GDI value at a side viewing angle of about 60° in the display device including the optical film OF-2b of FIG. 16B according to an embodiment. In FIG. 17B, the front CR value and the GDI value at the side viewing angle according to a variation in inclined angle of the first side surfaces SS1-2b and SS2-2b of the second protrusions EP2-2b are shown.

Referring to results of FIG. 17B, it may be confirmed that a low GDI and a high front CR value are obtained in the range of the inclined angle of about 87° to about 90°. For example, it may be confirmed that the display device has superior display quality in the range of the inclined angle in a range of about 87° to about 90°.

Figure 18:
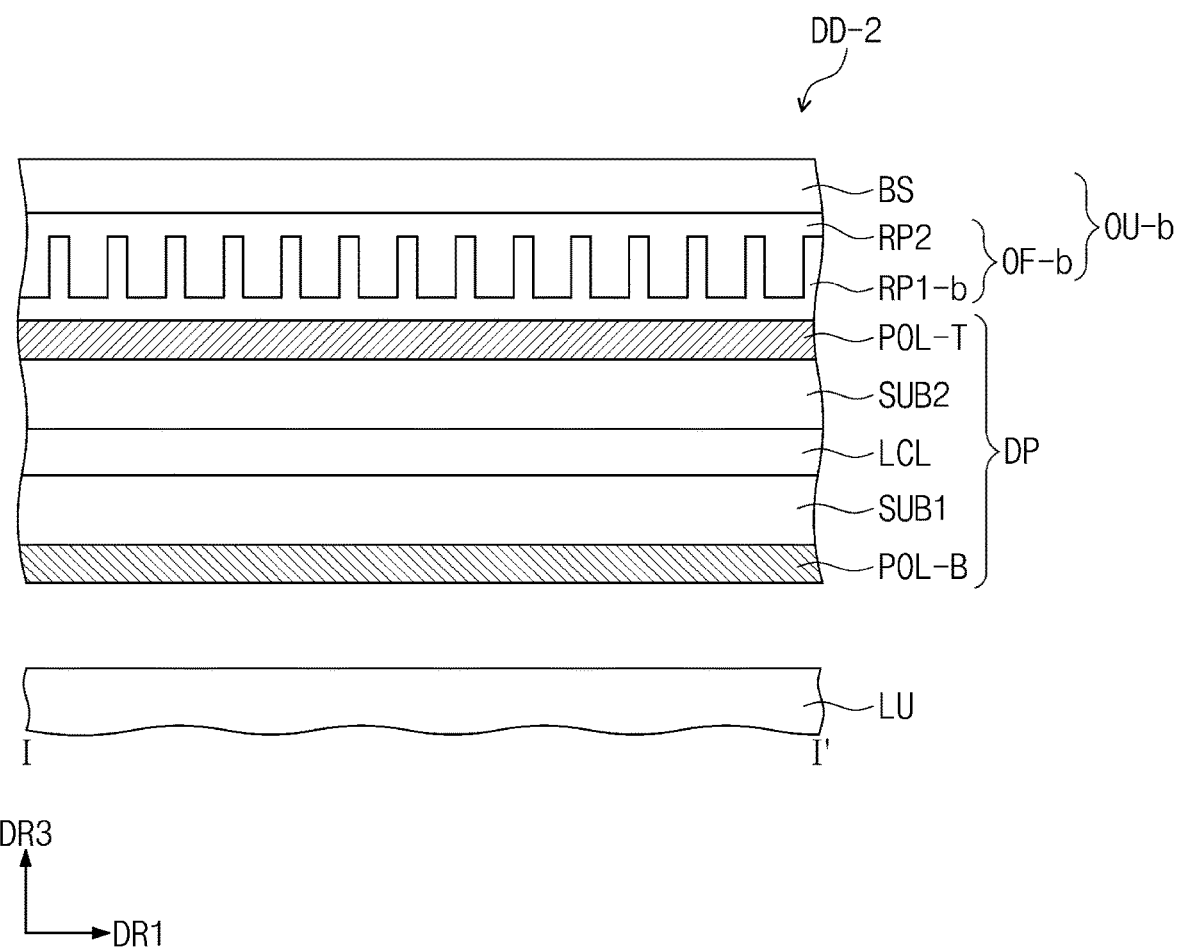

FIG. 18 is a schematic cross-sectional view of the display device according to an embodiment. In the descriptions of the display device with reference to FIG. 18, contents duplicated with those described with reference to FIGS. 1 to 10 will be omitted, and thus, their differences will be mainly described. A display device DD-2 according to an embodiment includes a liquid crystal display panel DP and an optical film OF-b disposed on the liquid crystal display panel DP. The display device DD-2 according to an embodiment may include a light source member LU disposed below the liquid crystal display panel DP and an optical member OU-b disposed on the liquid crystal display panel DP and including the optical film OF-b.

The optical film OF-b provided in the display device DD-2 according to an embodiment includes a first pattern layer RP1-*b* and a second pattern layer RP2. The first pattern layer RP1-*b* may have a refractive index approximately less than that of the second pattern layer RP2.

In the optical film OF-b provided in the display device DD-2 according to an embodiment, an arranged configuration of the first pattern layer RP1-*b* and the second pattern layer RP2 may be the same as or similar to that of the optical film OF of FIG. 6 according to an embodiment.

However, in the optical film OF-b according to an embodiment, the first pattern layer RP1-*b* may serve as an adhesion layer. The first pattern layer RP1-*b* may serve as a bonding member that bonds a polarizing layer POL-T of the liquid crystal display panel DP and the optical member OU-b, which may be substantially adjacent to each other. For example, the first pattern layer RP1-*b* may be an optically clear adhesive layer.

For example, in the display device DD-2 according to an embodiment, the optical film OF-b may be directly disposed on the liquid crystal display panel DP. When compared to the display device DD of FIG. 3 according to an embodiment, the adhesion layer AD between the liquid crystal display panel DP and the optical member OU may be omitted.

The display device according to an embodiment may include the optical film that is disposed on the liquid crystal display panel and may include the two pattern layers having refractive indexes different from each other to improve the viewing angle characteristics, the front brightness characteristics, and the contrast ratio characteristics. The optical film according to an embodiment may include the protrusions having the side surfaces that may be substantially perpendicular to the bottom surface in the optical pattern layer to improve the display quality of the display device.

The optical film according to an embodiment may include the protrusions having the side surfaces that are substantially perpendicular to the bottom surface and may include the pattern layer that satisfies the relationship between the width of each of the protrusions, the spaced distance between the adjacent protrusions, and the height of each of the protrusions so that the display device according to an embodiment may have the improved display quality.

The embodiment may provide the display device including the optical film, in which the side surface of each of the protrusions on the pattern layer is disposed substantially perpendicular to the bottom surface, to improve the display quality.

The embodiment may provide the display device including the optical film, in which each of the protrusions on the pattern layer having the relatively low refractive index is optimized in shape, arranged distance, and the like, to improve the display quality in the directions of the front and side viewing angles.

While the invention has been illustrated and described with reference to the embodiments thereof, it will be apparent to those of ordinary skill in the art that various changes in form and detail may be formed thereto without departing from the spirit and scope of the invention.

What is claimed is:

1. A display device comprising:
   a liquid crystal display panel; and
   an optical film disposed above the liquid crystal display panel, the optical film comprising a first pattern layer having a first refractive index and a second pattern layer having a second refractive index different from the first refractive index and disposed on the first pattern layer,
   wherein the first pattern layer comprises a first base part and a plurality of first protrusions disposed on the first base part,
   wherein each of the first protrusions comprises:
   a bottom surface adjacent to the first base part;
   an upper surface facing the bottom surface; and
   side surfaces between the bottom surface and the upper surface,
   wherein each of the side surfaces is perpendicular to the bottom surface and the upper surface.

2. The display device of claim 1, wherein an absolute value of a difference between the first refractive index and the second refractive index may be in a range of about 0.2 to about 0.25.

3. The display device of claim 1, wherein, in a cross-section perpendicular to the first base part, each of the first protrusions has a rectangular shape.

4. The display device of claim 1, wherein the first protrusions reflect light incident onto side surfaces of the first protrusions and emit the incident light as side light such that a ratio of light incident on the side surfaces of the first protrusions to the light emitted on a front surface of the second pattern layer is reduced.

5. The display device of claim 1, wherein the first refractive index is less than the second refractive index, and
   in a cross-section perpendicular to the first base part, a relationship between a spaced distance ($W_{P1}$) between adjacent first protrusions and a width ($W_1$) of each of the first protrusions is expressed as:

$$0.15 \leq W_1/W_{P1} \leq 0.45$$

where, $W_{P1}$ is a sum of the width ($W_1$) of each of the first protrusions and a minimally spaced distance ($W_2$) between the adjacent first protrusions, and
   all $W_1$ and $W_2$ are distances in a direction perpendicular to an extension direction of the first protrusions.

6. The display device of claim 1, wherein the first refractive index is less than the second refractive index, and
   in a cross-section perpendicular to the first base part, a relationship between a spaced distance ($W_{P1}$) between adjacent first protrusions and a height ($H_1$) of each of the first protrusions is expressed as:

$$0.75 \leq H_1/W_{P1} \leq 1.35$$

where, $W_{P1}$ is a sum of a width ($W_1$) of each of the first protrusions and a minimally spaced distance ($W_2$) between the adjacent first protrusions, and
   all $W_1$ and $W_2$ are distances in a direction perpendicular to an extension direction of the first protrusions.

7. The display device of claim 1, wherein the second pattern layer comprises:
   a second base part facing the first base part; and
   a plurality of second protrusions disposed below the second base part.

8. The display device of claim 7, wherein each of the first protrusions and the second protrusions has a stripe shape that extends in one direction.

9. The display device of claim 8, wherein the first pattern layer comprises first concave parts defined between the first protrusions, and
   the second pattern layer comprises second concave parts defined between the second protrusions,
   wherein the first protrusions are disposed to respectively correspond to the second concave parts, and the second protrusions are disposed to respectively correspond to the first concave parts.

10. The display device of claim 7, wherein the first refractive index is greater than the second refractive index, and
in a cross-section perpendicular to the second base part, a relationship between a spaced distance ($W_{P2}$) between adjacent second protrusions and a width ($W_2$) of each of the second protrusions is expressed as $$0.15 \leq W_2/W_{P2} \leq 0.45$$

where, $W_{P2}$ is a sum of the width ($W_2$) of each of the second protrusions and a minimally spaced distance ($W_1$) between the adjacent second protrusions, and
all $W_1$ and $W_2$ are distances in a direction perpendicular to an extension direction of the second protrusions.

11. The display device of claim 7, wherein the first refractive index is greater than the second refractive index, and
in a cross-section perpendicular to the second base part, a relationship between a spaced distance ($W_{P2}$) between adjacent second protrusions and a height ($H_2$) of each of the second protrusions is expressed as $$0.75 \leq H_2/W_{P2} \leq 1.35$$

where, $W_{P2}$ is a sum of a width ($W_2$) of each of the second protrusions and a minimally spaced distance ($W_1$) between the adjacent second protrusions, and
all $W_1$ and $W_2$ are distances in a direction perpendicular to an extension direction of the second protrusions.

12. The display device of claim 1, further comprising a plurality of cavities defined in one surface of the second pattern layer,
wherein the first protrusions are disposed to respectively correspond to the cavities.

13. The display device of claim 1, wherein the first pattern layer is an optically clear adhesive layer.

14. The display device of claim 13, wherein the optical film is directly disposed on the liquid crystal display panel.

15. A display device comprising:
a liquid crystal display panel; and
an optical film disposed above the liquid crystal display panel,
wherein the optical film comprises:
a first pattern layer comprising a first base part and a plurality of first protrusions disposed on the first base part; and
a second pattern layer comprising a second base part and a plurality of second protrusions disposed on the second base part,
wherein the first pattern layer has a refractive index less than that of the second pattern layer, and
in a cross-section perpendicular to the first base part, a ratio of a width of each of the first protrusions to a spaced distance between adjacent first protrusions is in a range of about 0.15 to about 0.45, and, in the cross-section perpendicular to the first base part, a ratio of a height of each of the first protrusions to the spaced distance between adjacent first protrusions is in a range of about 0.75 to about 1.35.

16. The display device of claim 15, wherein the first pattern layer is disposed closer to the liquid crystal display panel than the second pattern layer, and
wherein each of the first protrusions comprises:
a first bottom surface adjacent to the first base part;
a first upper surface adjacent to the second base part; and
first side surfaces between the first bottom surface and the first upper surface,
wherein, in the cross-section perpendicular to the first base part, an inclined angle of each of the first side surfaces with respect to the first bottom surface is in a range of about of 86° to about 90°.

17. The display device of claim 16, wherein, in the cross-section perpendicular to the first base part, a width of the first bottom surface and a width of the first upper surface are different from each other.

18. The display device of claim 17, wherein the width of each of the first protrusions is the width of the first bottom surface, and the spaced distance between the adjacent first protrusions is a sum of the width of the first bottom surface and a minimally spaced distance between the first bottom surfaces of the adjacent first protrusions, or
the width of each of the first protrusions is the width of the first upper surface, and the spaced distance between the first protrusions is a sum of the width of the first upper surface and a minimally spaced distance between the first upper surfaces of the adjacent first protrusions.

19. The display device of claim 15, wherein the second pattern layer is disposed closer to the liquid crystal display panel than the first pattern layer, and
wherein each of the second protrusions comprises:
a second bottom surface adjacent to the second base part;
a second upper surface adjacent to the first base part; and
second side surfaces between the second bottom surface and the second upper surface,
wherein, in a cross-section perpendicular to the second base part, an inclined angle of each of the second side surfaces with respect to the second bottom surface is in a range of about of 87° to about 90°.

20. The display device of claim 19, wherein, in the cross-section perpendicular to the second base part, a width of the second bottom surface and a width of the second upper surface are different from each other.

21. The display device of claim 15, wherein a difference in refractive index between the first pattern layer and the second pattern layer is in a range of about 0.2 to about 0.25.

* * * * *